(12) United States Patent
Van der Merwe et al.

(10) Patent No.: US 8,806,032 B2
(45) Date of Patent: Aug. 12, 2014

(54) METHODS AND APPARATUS TO MIGRATE BORDER GATEWAY PROTOCOL SESSIONS BETWEEN ROUTERS

(75) Inventors: Jacobus Van der Merwe, New Providence, NJ (US); Jennifer Rexford, Princeton, NJ (US); Eric Robert Keller, Ewing, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 251 days.

(21) Appl. No.: 12/969,392

(22) Filed: Dec. 15, 2010

(65) Prior Publication Data
US 2012/0158976 A1    Jun. 21, 2012

(51) Int. Cl.
*G06F 15/16* (2006.01)

(52) U.S. Cl.
USPC ............................ 709/228; 709/227; 709/229

(58) Field of Classification Search
CPC .............. H04L 29/06; H04L 29/08072; H04L 29/08576; H04L 29/0809; H04L 29/06537
USPC ................... 709/227–229, 223; 370/400–401
See application file for complete search history.

(56) References Cited

U.S. PATENT DOCUMENTS

| | | | |
|---|---|---|---|
| 7,197,040 B2 | 3/2007 | Bressoud et al. | |
| 7,340,500 B2 | 3/2008 | Traversat et al. | |
| 7,515,525 B2 * | 4/2009 | Appanna et al. | 370/217 |
| 7,583,590 B2 | 9/2009 | Sivakumar et al. | |
| 2006/0092976 A1 * | 5/2006 | Lakshman et al. | 370/469 |
| 2006/0171404 A1 * | 8/2006 | Nalawade et al. | 370/401 |
| 2007/0014231 A1 * | 1/2007 | Sivakumar et al. | 370/216 |
| 2009/0213862 A1 * | 8/2009 | Zhang et al. | 370/401 |
| 2010/0091685 A1 | 4/2010 | Agrawal et al. | |
| 2010/0138488 A1 * | 6/2010 | Fletcher et al. | 709/203 |

FOREIGN PATENT DOCUMENTS

| | | |
|---|---|---|
| WO | 2009152728 | 12/2009 |
| WO | WO 2009152728 A1 * | 12/2009 |

OTHER PUBLICATIONS

Agrawal et al. RouterFarm: Towards a Dynamic, Manageable Network Edge, Sep. 2006, ACM.*
"RouterFarm: Towards a Dynamic, Manageable Network Edge". Mukesh Agrawal, 2006. ACM 1-59593-417-0/06/0009. Page 2.*
Keller, Eric et al., "Seamless BGP Migration With Router Grafting," Apr. 2010, (14 pages).
Keller, Eric et al., "The 'Platform as a Service' Model for Networking," Apr. 2010, (6 pages).
Keller, Eric et al., "Seamless BGP Migration With Router Grafting," NSDI Apr. 2010, (44 pages).

(Continued)

*Primary Examiner* — Hassan Phillips
*Assistant Examiner* — Siren Wei
(74) *Attorney, Agent, or Firm* — Hanley, Flight & Zimmerman, LLC

(57) ABSTRACT

Methods and apparatus to migrate border gateway protocol sessions between routers are disclosed. An example method to migrate a border gateway protocol session from a first router to a second router disclosed herein comprises exporting a connection state to migrate a transport control protocol connection supporting the border gateway protocol session with a session endpoint from the first router to the second router, and after the transport control protocol connection has been migrated to the second router, announcing, from the first router to the second router, routes contained in an exported routing information base associated with the session endpoint, the second router to process the routes to migrate handling of the border gateway protocol session with the session endpoint to the second router.

18 Claims, 15 Drawing Sheets

(56) References Cited

OTHER PUBLICATIONS

Agarwal, Sharad et al., "Impact of BGP Dynamics on Router CPU Utilization," Apr. 2004 (11 pages).
Gottlieb, Joel et al., "Automated Provisioning of BGP Customers" Nov./Dec. 2003 (23 pages).
Wang, Yi et al., "Virtual Routers on the Move: Live Router Migration as a Network-Management Primitive," SIGCOMM'08, Aug. 17-22, 2008, Seattle, Washington, USA, (12 pages).
Wei, John et al., "Convergence through Packet-Aware Transport [Invited]," Optical Society of America, Journal of Optical Networking, Apr. 2006, vol. 5, No. 4, (25 pages).
"CoreDirector FS Multiservice Optical Switch," Ciena: the Network Specialist, http://www.ciena.com/products/core-director/, accessed on Dec. 12, 2010, (2 pages).
Agrawal, Mukesh et al., "RouterFarm: Towards a Dynamic, Manageable Network Edge," SIGCOMM'06 Workshops, Sep. 11-15, 2006, Pisa, italy, (6 pages).
Rostami, A. et al., "An Optical Integrated System for Implementation of NxM Optical Cross-Connect, Beam Splitter, Mux/demux and Combiner," IJCSNS International Journal of Computer Science and Network Security, vol. 6, No. 7B, Jul. 2006, (7 pages).
Blunk, L. et al., "MRT Routing Information Export Format," IETF Trust, draft-ieft-grow-mrt-13.txt, Sep. 9, 2010 (33 pages).
Braden, R., "RFC 1122—Requirements for Internet Hosts—Communication Layers," Network Working Group, Internet Engineering Task Force, Oct. 1989, http://www.faqs.org/rfcs/rfc1122.html, accessed Dec. 15, 2010, (101 pages).
Ishiguro, Kunihiro et al., "Quagga: A Routing Software Package for TCP/IP Networks," Quagga 0.0.4, Jul. 2006, (128 pages).
Bernaschi, Massimo et al., "SockMi: a Solution for Migrating TCP/IP Connections," 2007 (5 pages).
Kohler, Eddie et al., "The Click Modular Router," Aug. 2000 (34 pages).
"University of Oregon Route Views Project," Advanced Network Technology Center, University of Oregon, http://www.routeviews.org/, accessed on Dec. 15, 2010, (4 pages).
White, Brian et al., "An Integrated Experimental Environment for Distributed Systems and Networks," Dec. 2002 (16 pages).
Teixeira, Renata et al., "Dynamics of Hot-Potato Routing in IP Networks," Sigmetrics/Performance'04, Jun. 12-16, 2004, New York, NY, (12 pages).
Francois, Pierre et al., "Disruption Free Topology Reconfiguration in OSPF Networks," May 2007 (9 pages).
Shaikh, Aman et al., "Avoiding Instability During Graceful Shutdown of Multiple OSPF Routers," Jun. 2006 (12 pages).
Sangli, S. et al., "RFC 4724—Graceful Restart Mechanism for BGP," Network Working Group, Internet Engineering Task Force, Jan. 2007, http://faqs.org/rfcs.rfc4724.html, accessed on Dec. 15, 2010, (13 pages).
Clark, Christopher et al., "Live Migration of Virtual Machines," May 2005 (14 pages).
Kozuch, Michael A. et al., "Migration Without Virtualization," Intel Research Pittsburgh, May 2009 (5 pages).
"Cisco IOS High Availability Curbs Downtime with Faster Reloads and Upgrades: For Single Processor Routing and Switching Systems," Cisco Systems, 2004 (5 pages).
Ballani, Hitesh et al., "ViAggre: Making Routers Last Longer!" Apr. 2009 (6 pages).
Snoeren, Alex C. et al., "An End-to-End Approach to Host Mobility," 6th ACM/IEEE International Conferences on Mobile Computing and Networking (MobiCom '00), Aug. 2000 Boston, MA, (12 pages).

* cited by examiner

US 8,806,032 B2

METHODS AND APPARATUS TO MIGRATE BORDER GATEWAY PROTOCOL SESSIONS BETWEEN ROUTERS

FIELD OF THE DISCLOSURE

This disclosure relates generally to network routing and, more particularly, to methods and apparatus to migrate border gateway protocol sessions between routers.

BACKGROUND

To maintain and increase customer satisfaction, network operators strive to introduce new services and improve the reliability of their networks to avoid service disruptions. As such, operators often make changes to the network to upgrade faulty equipment, deploy new services, install new routers to handle increased traffic and/or different traffic patterns, etc. Unfortunately, performing these types of changes with existing routers and routing protocols can result in the very service disruptions network operators strive to avoid. Furthermore, service-level agreements with customers often prohibit events that result in a service disruption without receiving prior approval and scheduling a maintenance window. However, in today's networks, even the relatively basic task of migrating (or re-homing) a border gateway protocol (BGP) session from a migrate-from router currently handling the session to a migrate-to router that is to commence handling the session can result in long downtimes of up to several minutes.

DETAILED DESCRIPTION

Figure 1:
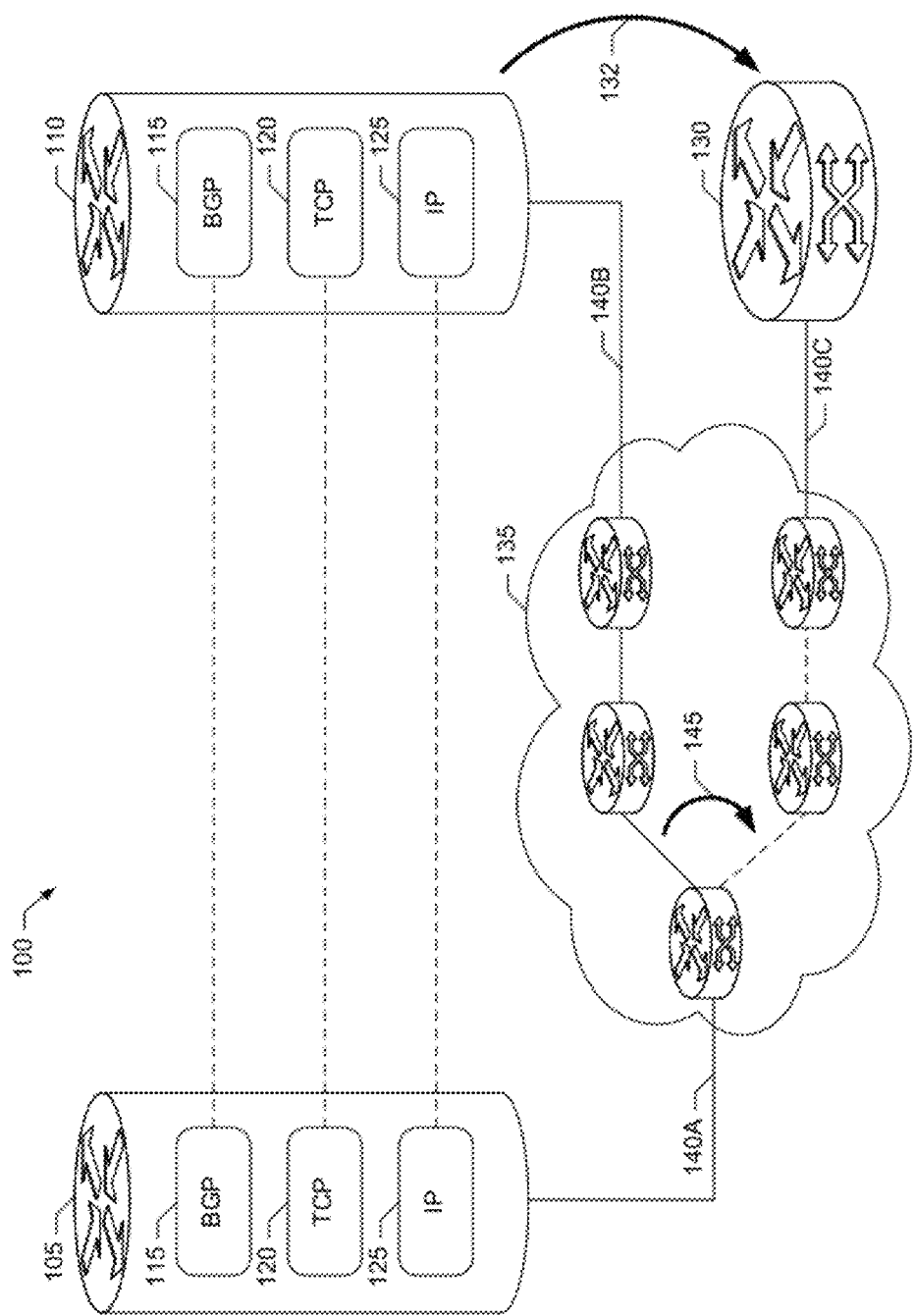
FIG. 1 is block diagram of an example system in which a border gateway protocol (BGP) session is to be migrated between two example routers.

Methods and apparatus to migrate a border gateway protocol (BGP) session, for example, from a migrate-from router currently handling the session to a migrate-to router that is to commence handling the session are disclosed herein. An example method described herein involves the migrate-from router exporting a connection state to migrate a transport control protocol (TCP) connection supporting the BGP session with a session endpoint from the migrate-from router to the migrate-to router. An Internet protocol (IP) link supporting the TCP connection is also migrated from the migrate-from router to the migrate-to router when or after the TCP connection is migrated. After the TCP connection has been migrated to the migrate-to router, the example method involves the migrate-from router announcing routes contained in an exported routing information base (RIB) associated with the session endpoint to the migrate-to router. The migrate-to router then processes these routes to migrate handling of the BGP session with the session endpoint from the migrate-from router to the migrate-to router.

Another example BGP session migration method described herein involves a migrate-to router importing a connection state to migrate a TCP connection supporting a BGP session with a session endpoint from a migrate-from router currently handling the session to the migrate-to router. An IP link supporting the TCP connection is also migrated from the migrate-from router to the migrate-to router when or after the TCP connection is migrated. After the TCP connection has been migrated to the migrate-to router, the example method involves the migrate-to router receiving, from the migrate-from router, routes previously announced by the session endpoint. The migrate-from router then processes these routes received from the migrate-from router to migrate handling of the BGP session with the session endpoint from the migrate-from router to the migrate-to router.

Conceptually, the examples described herein can be viewed as performing router grafting in which functional parts of one router (e.g., a migrate-from router) are removed and merged (e.g., grafted) to another router (e.g., a migrate-to router). BGP session migration via router grafting, as disclosed herein, allows an operator to re-home a customer with little to no disruption (e.g., seamlessly), as compared to downtimes today measured in minutes. Additionally, grafting a BGP session in accordance with the examples described herein can help in balancing load between routers or router processor blades, conducting planned maintenance, performing traffic engineering, etc. Further potential benefits of router grafting as performed by the example methods and apparatus disclosed herein are described in greater detail below.

Generally, migrating (or grafting) a BGP session as described herein involves (i) migrating the underlying TCP connection, (ii) exchanging routing state, (iii) moving routing protocol configuration from one router to another, and (iv) migrating the underlying IP link, although not necessarily in this order. Furthermore, these actions are performed transparently (e.g., such that the remote BGP session endpoint is not modified and is unaware migration is happening) and without disrupting packet forwarding and routing (e.g. data packets are not dropped and routing adjacencies remain up). In the examples described herein, transparency can be achieved, for example, by bootstrapping a routing session at the migrate-to router providing the BGP session's new homing location, with the migrate-from router emulating the remote endpoint. The migrate-to router then takes over the role of the migrate-from router, sending appropriate routing updates to notify the remote endpoint of routing changes.

Turning to the figures, a block diagram of an example network 100 in which a BGP session is to be migrated between routers using router grafting is illustrated in FIG. 1. In the illustrated example, two example neighbor routers 105 and 110 exchange BGP update messages over an example BGP session 115. The BGP session runs on top of an example TCP connection 120 that directs packets over an example IP link 125 communicatively coupling the routers 105 and 110. As illustrated in the example of FIG. 1, migrating (or grafting) the BGP session 115 from the router 110 to another example router 130 (represented by a directed line 132 in FIG. 1) in accordance with the example techniques described herein involves moving the IP link 125, the TCP connection 120, and BGP session 115 from the router 110 to the router 130.

In some examples, the IP link 125 can be implemented by a direct wired or wireless connection between two router routers 105 and 110. In other examples, the IP link 125 can be implemented by one or more hops in an underlying layer-two transport network, such as the example transport network 135 illustrated in FIG. 1. For example, routers at an exchange point between autonomous systems often connect via a shared switch, and an Internet service provider (ISP) typically connects to its customers over an access network. In some examples, the transport network 135 is geographically contained, such as in the case of a packet access network. In other examples, the transport network 135 is more geographically widespread, such as in the case of a programmable optical transport network having a national footprint. Also, layer-two networks, such as the network 135, are typically programmable, allowing dynamic set-up and tear-down of layer-three links. An example of this programmability is illustrated in FIG. 1 in which a physical link 140A-B between routers 105 and 110 is through the programmable transport network 135 and can be changed (e.g., illustrated in FIG. 1 by the directed line 145) to connect routers 105 and 130 via a physical link 140A-C. Such programmability enables seamless migration of the IP 125 link from one location (e.g., the router 110) to another location (e.g., the router 130) served by the layer-two network 135 and, as such, enables re-homing of a customer's access link to terminate on a different router (e.g., the router 130 instead of the router 110) in the network 100.

In the illustrated example of FIG. 1, the routers 105 and 110 exchange BGP messages over the underlying TCP connection 120. Unlike a TCP connection between, for example, a web client and a web server, the TCP connection 120 is to stay up (e.g., enabled) for relatively long periods of time, because the two routers 105 and 110 repeatedly exchange BGP messages related to the BGP session 115. Furthermore, each router 105 and 110 sends keep-alive messages to enable the other router to detect lapses in connectivity. In some examples, after missing three (or some other number of) such keep-alive messages, a router (such as the router 105) will declare the other router (such as the router 110) as unavailable and discard the BGP routes learned from that neighbor router. As such, migration (or grafting) the BGP session 115 in accordance with the example techniques described herein involves timely migration of the underlying TCP connection.

In the illustrated example of FIG. 1, the neighbor routers 105 and 110 form the BGP session 115 by: (1) establishing the TCP session 120; (2) sending messages negotiating the properties of the BGP session; and then (3) exchanging a BGP "best route" for each destination prefix announced by each of the routers 105 and 110. This procedure is controlled by a BGP state machine executing on the routers 105 and 110 that specifies the BGP messages to be exchanged and how these exchanged BGP messages are to be handled. After the BGP session 115 is established, the two routers 105 and 110 send incremental BGP update messages to announce new routes and withdraw routes that are no longer available. Each router 105, 110 stores the BGP routes learned from its neighbor in a first RIB, referred to as an Adj-RIB-in table. Each router 105, 110 also stores the BGP routes announced to the neighbor in a second table, referred to as an Adj-RIB-out table. The BGP session 115 also has a configuration state that controls how each router 105, 110 filters and modifies BGP routes that it imports from (or exports to) the remote neighbor. As such, migrating (or grafting) the BGP session 115 in accordance with the example techniques described herein involves transferring BGP routing state in the form of RIB information (also referred to as RIB state), as well as moving the associated BGP configuration state from the migrate-from router (e.g., the router 110) to the migrate-to router (e.g., the router 130). BGP session migration also involves updating the routes provided to other routers in the network 100, as described in greater detail below.

The example BGP session migration (or grafting) techniques disclosed herein can be used with a variety of different router implementations. For example, the routers 105, 110 and 130 can be implemented using any type of network router device and/or can be included as one or more portions of another network device, such as a network switch, a bridge, etc. Also, the routers 105, 110 and 130 of FIG. 1 can be geographically distributed routers, different router processor blades included in a router chassis, etc., or any combination thereof.

Generally, a router implementing one or more of the routers 105, 110 and 130 includes a processor for running the BGP routing process, multiple interfaces for terminating links, and a switching fabric for directing packets from one interface to another. The BGP routing process maintains sessions with multiple neighbor routers (also referred to as neighbors) and runs a decision process over the Adj-RIB-in tables to select a single "best" route for each destination prefix. The routing process stores the best route in a Loc-RIB table, and further applies export policies to construct the Adj-RIB-out tables and send the corresponding update messages to each neighbor.

Figure 2:
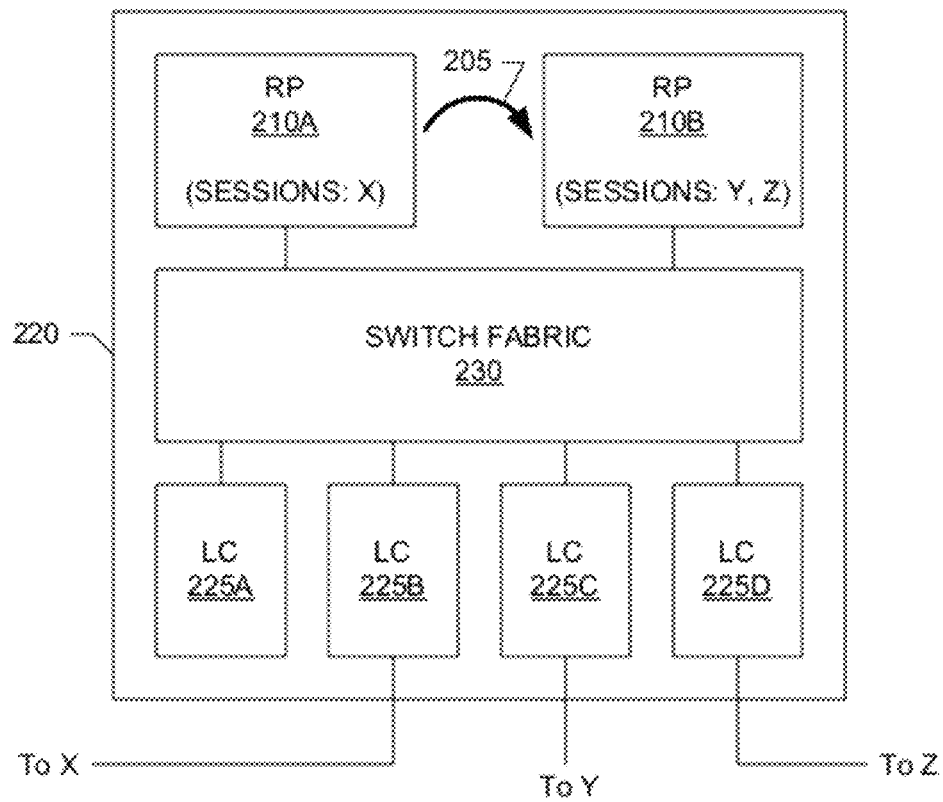
FIG. 2 is a block diagram of an example system in which a BGP session is to be migrated between two example router processor blades in an example router.
Figure 3:
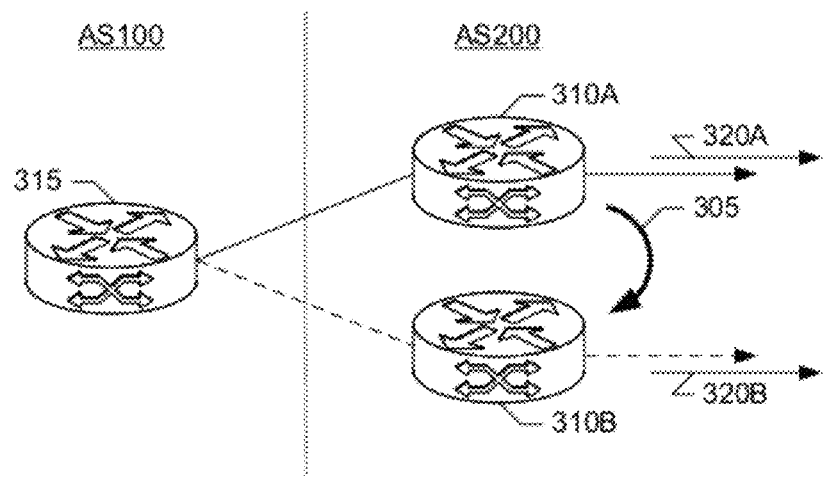
FIG. 3 is a block diagram of an example system in which a BGP session is to be migrated between two example routers in an autonomous system (AS) different from the AS in which the session endpoint of the BGP session resides.

FIGS. 2-3 further illustrate the variety of different router implementations supported by the example BGP session migration techniques disclosed herein. In particular, FIG. 2 illustrates an example system in which a BGP session is to be migrated (represented by a directed arrow 205) between two example router processor blades 210A and 210B in an example router 220. Today's high-end routers are typically large distributed systems, including hundreds of interfaces 225A-D and multiple processor blades 210A-B spread over one or more chassis. Such routers can run one or more BGP processes on each processor blade 210A-B, as shown in FIG. 2. For such a cluster-based router 220 to be scaleable, each BGP process runs its own decision process and exchanges its "best" route with the other BGP processes in the router 220 using, for example, a modified version of internal BGP (iBGP). Also, any processor blade 210A-B can handle any BGP session, because all processor blades 210A-B can reach the interface cards 225A-D through a switching fabric 230. As such, when grafting a BGP session from one blade 210A to another blade 210B in the example router 220 of FIG. 1 (e.g., such as migrating the BGP session with endpoint X from blade 210A to blade 210B), the underlying layer-three link does not need to be migrated. Instead, the switching fabric 230 can be configured to switch the link to the appropriate blade (e.g., such as the blade 210B in this example).

FIG. 3 illustrates an example system in which a BGP session is to be migrated (represented by a directed arrow 305) between two example routers 310A-B in an autonomous system (AS200) different from the autonomous system (AS100) in which the remote session endpoint 315 of the BGP session resides. An autonomous system (AS) typically includes multiple, geographically-distributed routers. Each router forms BGP sessions with neighboring routers in other autonomous systems, and uses iBGP to disseminate its "best" route to other routers within the AS. The routers in the same AS also run an Interior Gateway Protocol (IGP), such as open shortest path first (OSPF) or intermediate system to intermediate system (IS-IS), to compute paths to reach each other. Each router in the AS runs its own BGP process(es) and selects its own best route for each prefix. The routers may come to different decisions about the best route, not only because they learn different candidate routes, but also because the decision depends on the IGP distances to other routers in the routes (also known as hot-potato routing). For example, in FIG. 3 the routers 310A and 310B have different paths 320A and 320B, respectively, to a same destination router (not shown). As such, grafting a BGP session with router 315 from the router 310A to the router 310B may involve changing the BGP routing decisions associated with reaching the destination router because the path to reach the destination router has changed.

An example router grafting processor 400 to implement BGP session migration (or grafting) in the example routers 105, 110, 130, 220, 310A, 310B and/or 315 described above is illustrated in FIG. 4. The router grafting processor 400 of the illustrated example performs both migrate-from router processing and migrate-to router processing, as described in greater detail below. As such, the router grafting processor 400 can be included in, implemented by, communicatively coupled with, etc., one or more of the routers 105, 110, 130, 220, 310A, 310B, 315, and/or any other router in which BGP session migration is to be performed in accordance with the examples described herein The router grafting processor 400 performs a coordinated sequence of operations to migrate BGP sessions between routers. An example of such a sequence of operations is illustrated in FIGS. 5A-D, which are described in greater detail below. To control and coordinate the sequence of operations to migrate a BGP session, the router grafting processor 400 includes an example grafting controller 405. In some examples, the grafting controller 405 is implemented by a graft daemon that initiates BGP session migration processing, and interacts with the other elements of the router grafting processor 400. In some examples, the graft daemon 405 can be reached by an IP address. Using this IP address, the graft daemon 405 on the migrate-from router initiates a TCP connection with the counterpart graft daemon 405 on the migrate-to router over which BGP session migration can occur.

The router grafting processor 400 of the illustrated example also includes an example physical connection migrator 410 to migrate the TCP connection and IP links supporting a BGP session undergoing migration. In some examples, the physical connection migrator 410 is implemented, at least in part, by a SockMI application programming interface (API) adapted to export and import TCP connection state information, such as IP address(es), packet sequence number(s), packet acknowledgment number(s), etc., as described in greater detail below. The physical connection migrator 410 is communicatively coupled with an example network stack storage 415 to store the exported and/or imported TCP connection state information. The network stack storage 415 can be implemented by any type of memory or storage technology. For example, the network stack storage 415 can be implemented by the example mass storage device 1530 and/or the example volatile memory 1518 included in the example processing system 1500 of FIG. 15, which is described in greater detail below.

The router grafting processor 400 of the illustrated example further includes an example routing state migrator 420 to migrate routing state information for the BGP session undergoing migration. In some examples, the routing state migrator 420 is implemented, at least in part, by one or more Quagga routing software modules adapted to export and import BGP routing state information (e.g., such as routing information stored in one or more RIBs), and re-execute BGP decision procedures based on the imported BGP routing state information, as described in greater detail below. The routing state migrator 420 is communicatively coupled with an example routing state storage 425 to store the exported and/or imported routing state information. The routing state storage 425 can be implemented by any type of memory or storage technology. For example, the routing state storage 425 can be implemented by the example mass storage device 1530 and/or the example volatile memory 1518 included in the example processing system 1500 of FIG. 15, which is described in greater detail below.

Figure 4:
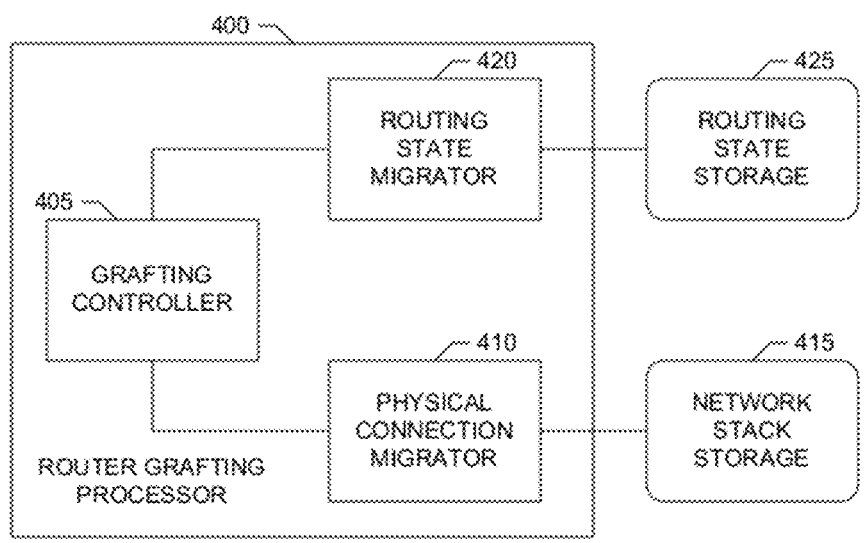
FIG. 4 is a block diagram of an example router grafting processor that can be used to migrate BGP sessions between routers in the examples systems of FIGS. 1, 2 and/or 3.

As mentioned above, FIGS. 5A-D illustrate an example sequence of operations performed by the router grafting processor 400 of FIG. 4 to migrate a BGP session with an example endpoint 505 from an example migrate-from router 510A to an example migrate-to router 510B (e.g., in the same AS). The routers 510A and 510B include respective instances 400A and 400B of the router grafting processor 400 of FIG. 4. The routers 510A and 510B also include respective instances 415A and 415B of the network stack storage 415 of FIG. 4, and respective instances 425A and 425B of the routing state storage 425 of FIG. 4. Otherwise, the routers 510A-B can be from the same or different vendors and run similar or different routing software. To reduce the complexity of the drawings, the router grafting processors 400A-B are omitted for clarity from FIGS. 5B-D.

Figure 5A:
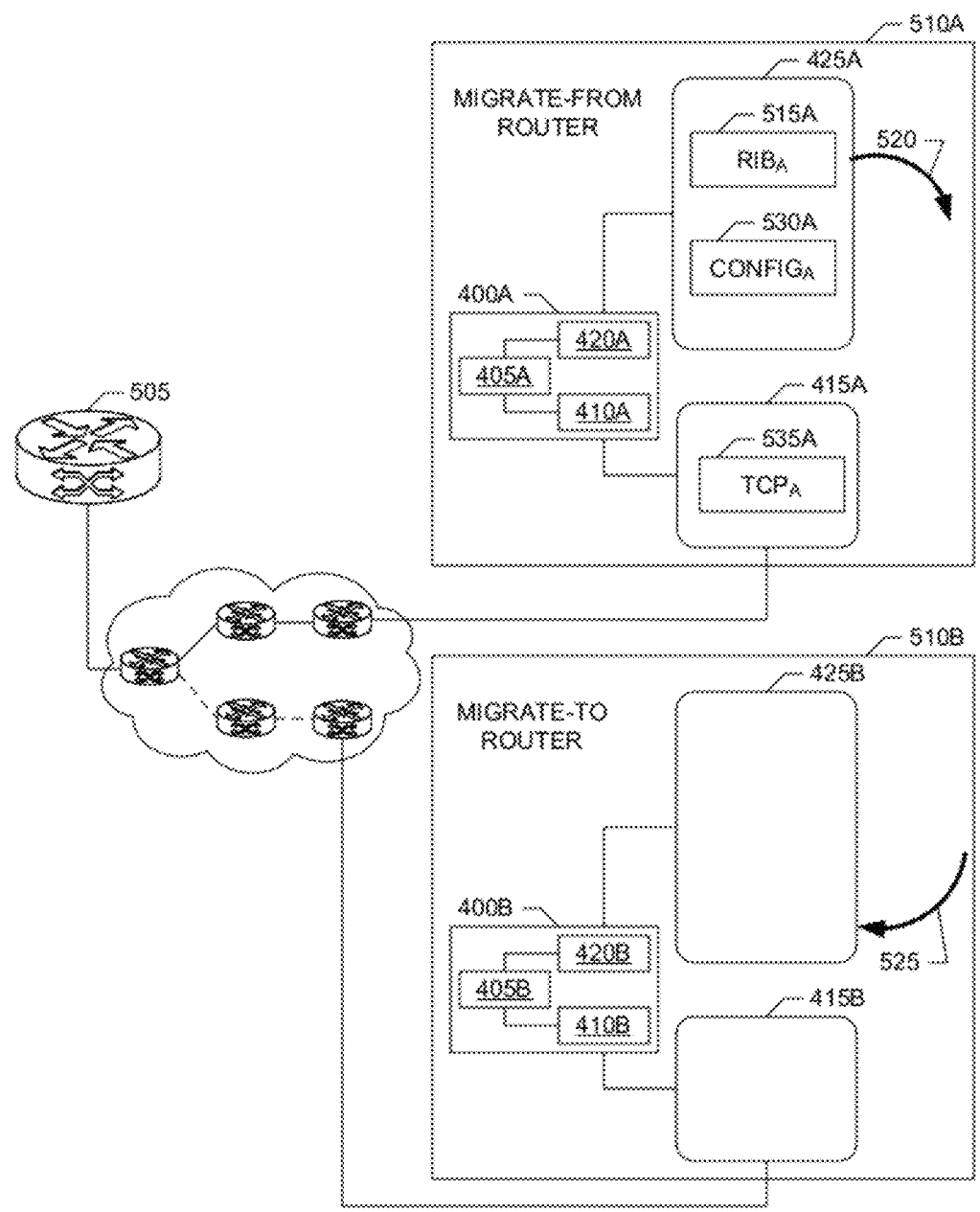
FIGS. 5A-D collectively illustrate an example operation of the router grafting processor of FIG. 4 to migrate a BGP session from an example migrate-from router to an example migrate-to router.

Turning to FIG. 5A, when the illustrated BGP session migration process starts, the migrate-from router 510A is responsible for handling a BGP session with the remote endpoint router 505. This BGP session with router 505 is to be migrated to the migrate-to router 510B. The migrate-from router 510A begins exporting routing information 515A (represented as a directed line 520 in FIG. 5). Additionally, the migrate-to router 510 is initialized with its own session-level data structures and a copy of the policy configuration 530A (represented as a directed line 525 in FIG. 5), but without actually establishing the session.

Figure 5B:
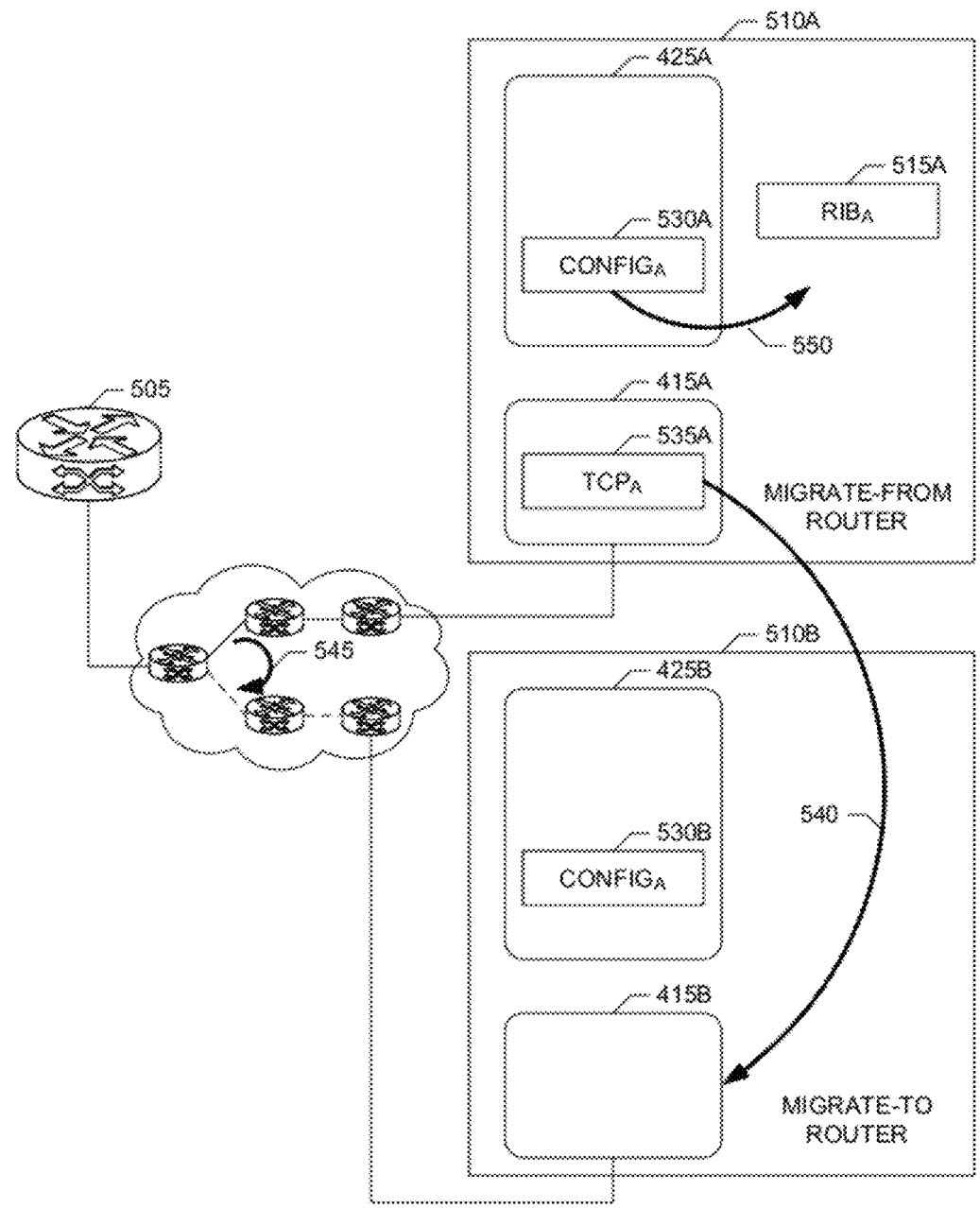

In FIG. 5B, the routing information 515A has been exported at the migrate-from router 510A, and a copy of the configuration state 530A is stored as configuration state 530B at the migrate-to router 510B. Next, the TCP connection state 535A is migrated (represented as a directed line 540 in FIG. 5B), followed by the underlying link (represented as a directed line 545 in FIG. 5B). Additionally, the BGP session peer is deleted at the migrate-from router 510 (represented as a directed line 550 in FIG. 5B).

Figure 5C:
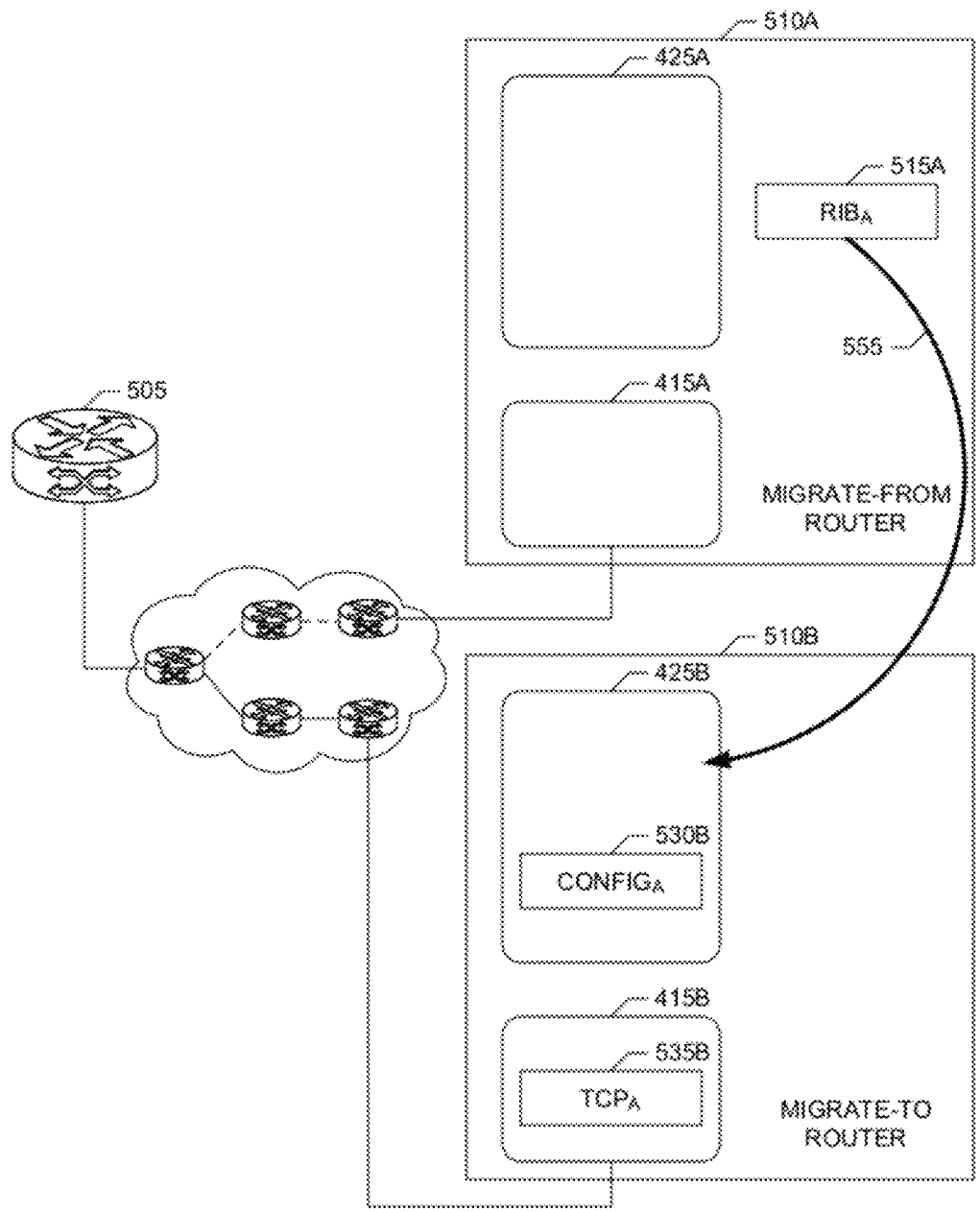
Figure 5D:
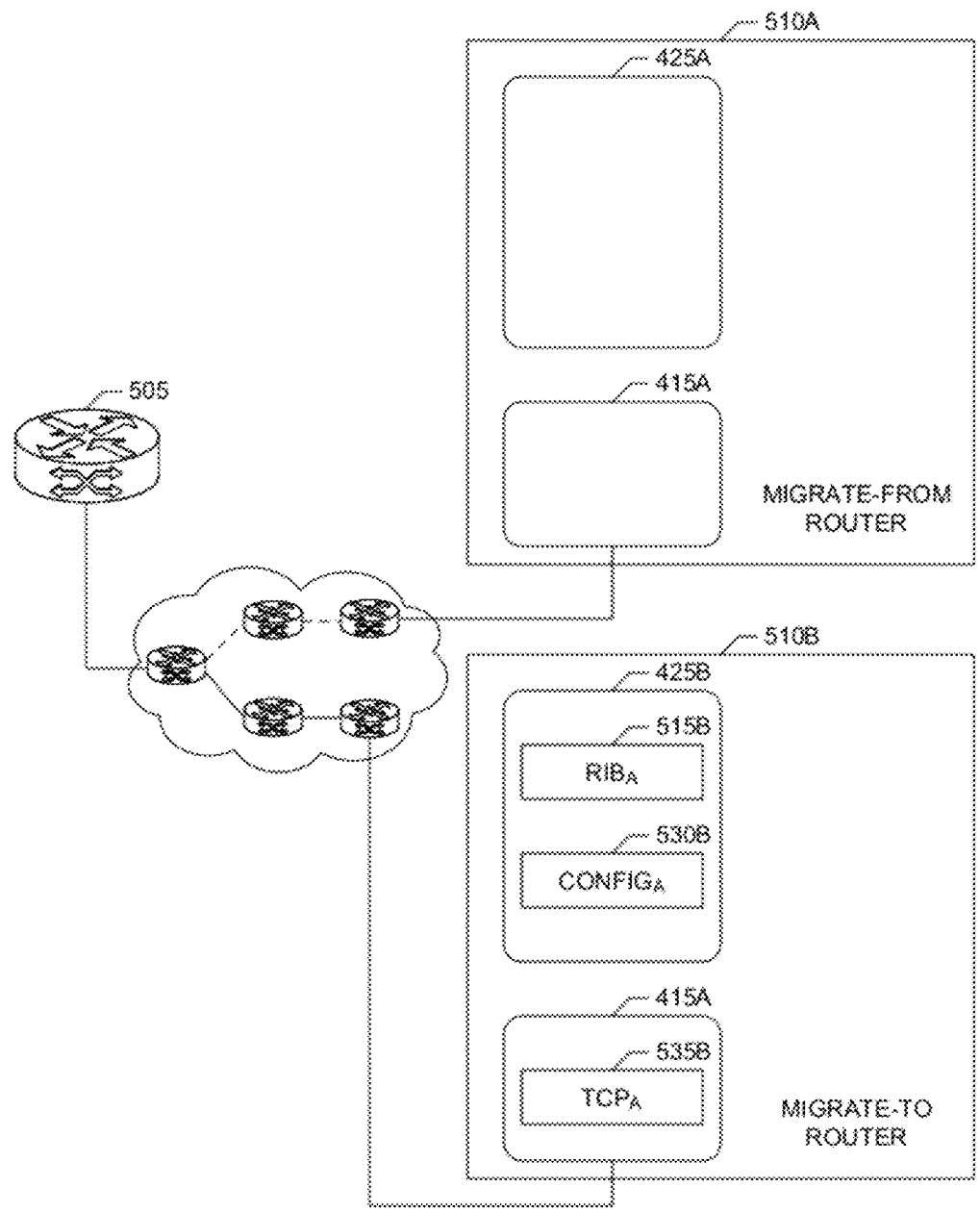

In FIG. 5C, a copy of the TCP connection state 535A is stored as TCP connection state 535B at the migrate-to router 510B. Next, the migrate-to router 510B imports the routing state 515A (represented as a directed line 555 in FIG. 5C). In FIG. 5D, the routing state 515A is imported to become routing state 515B at the migrate-to router 510B, as described in greater detail below. The migrate-to router 510B also announces to other routers, including the endpoint 505, route updates for routes that have changed due to the imported routing state 510B. The result is the migrate-to router 510 handling the BGP session with the remote endpoint 505, as shown in FIG. 5D.

While an example manner of implementing the router grafting processor 400 has been illustrated in FIG. 4, one or more of the elements, processes and/or devices illustrated in FIG. 4 may be combined, divided, re-arranged, omitted, eliminated and/or implemented in any other way. Further, the example grafting controller 405, the example physical connection migrator 410, the example network stack storage 415, the example routing state migrator 420, the example routing state storage 425 and/or, more generally, the example router grafting processor 400 of FIG. 4 may be implemented by hardware, software, firmware and/or any combination of hardware, software and/or firmware. Thus, for example, any of the example grafting controller 405, the example physical connection migrator 410, the example network stack storage 415, the example routing state migrator 420, the example routing state storage 425 and/or, more generally, the example router grafting processor 400 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example router grafting processor 400, the example grafting controller 405, the example physical connection migrator 410, the example network stack storage 415, the example routing state migrator 420 and/or the example routing state storage 425 are hereby expressly defined to include a tangible computer readable medium such as a memory, digital versatile disk (DVD), compact disk (CD), etc., storing such software and/or firmware. Further still, the example router grafting processor 400 of FIG. 4 may include one or more elements, processes and/or devices in addition to, or instead of, those illustrated in FIG. 4, and/or may include more than one of any or all of the illustrated elements, processes and devices.

Figure 6:
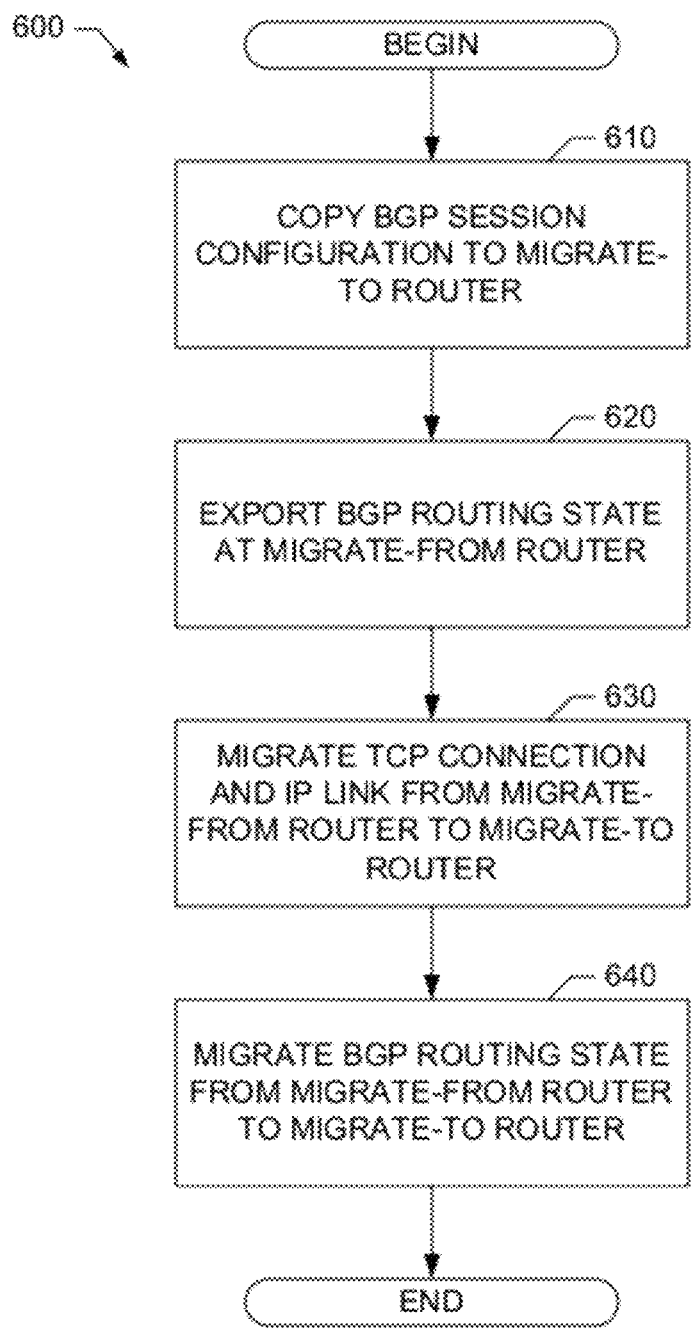
FIG. 6 is a flowchart representative of example machine readable instructions that may be executed to implement the router grafting processor of FIG. 4.
Figure 8:
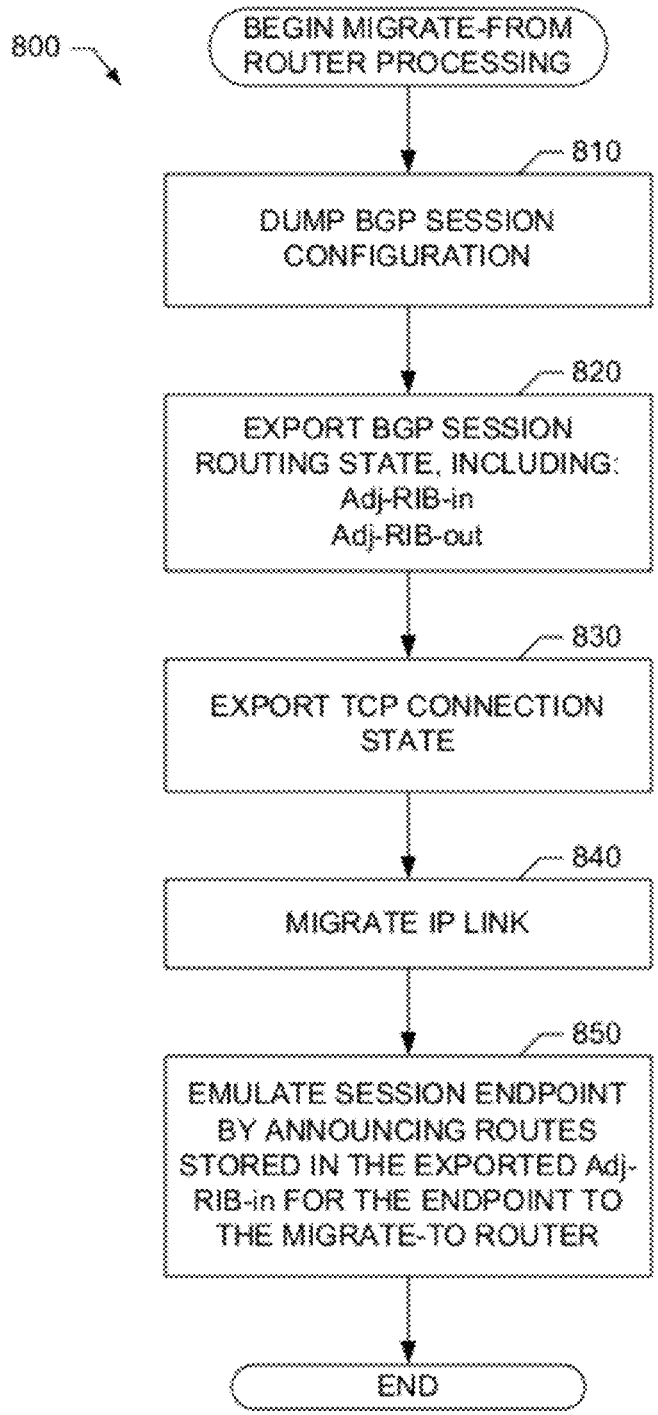
FIG. 8 is a flowchart representative of example machine readable instructions that may be executed to implement migrate-from router processing in the router grafting processor of FIG. 4.
Figure 9:
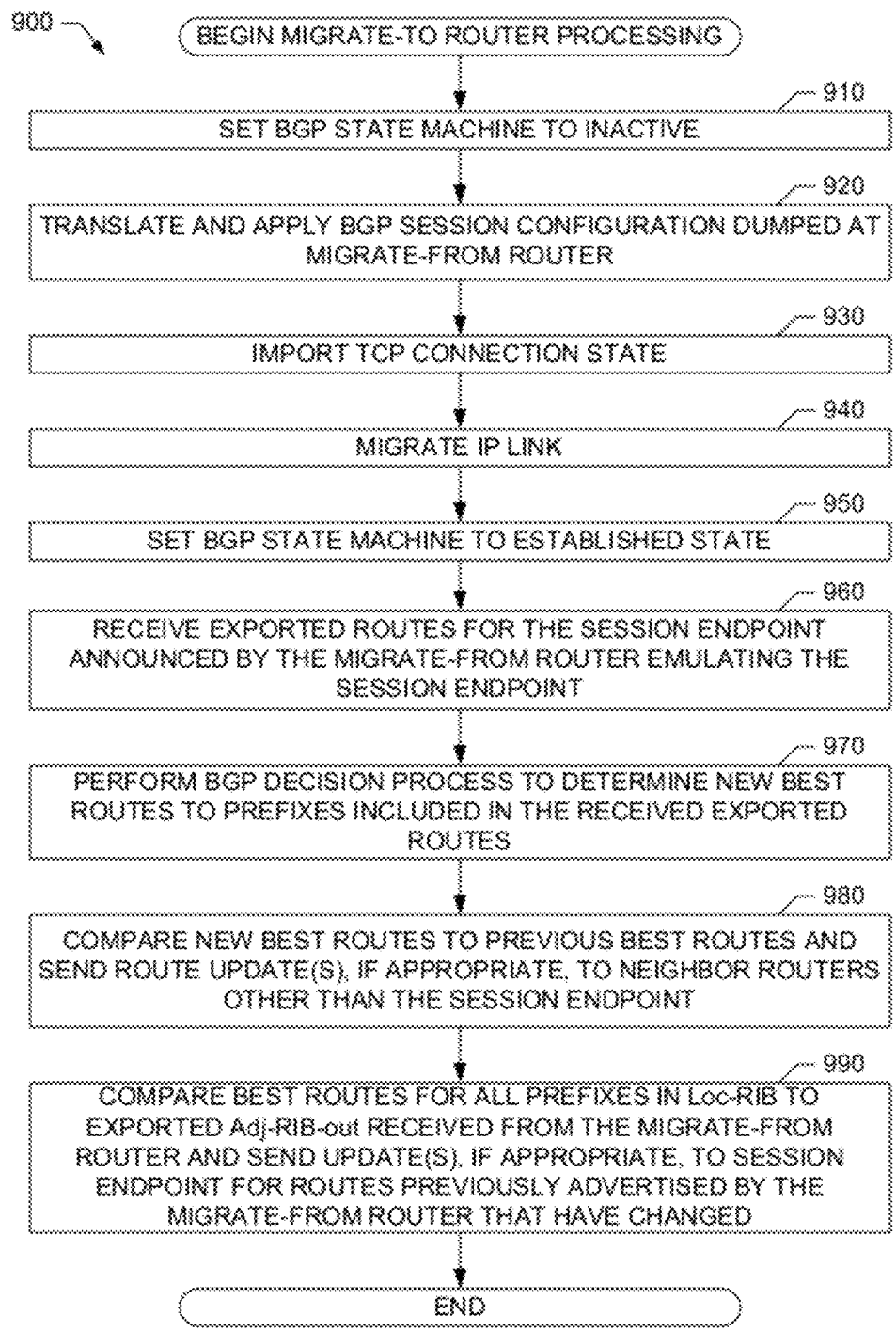
FIG. 9 is a flowchart representative of example machine readable instructions that may be executed to implement migrate-to router processing in the router grafting processor of FIG. 4.

Flowcharts representative of example machine readable instructions that may be executed to implement one or more of the routers 105, 110, 130, 220, 310A, 310B and/or 315, the example router grafting processor 400, the example grafting controller 405, the example physical connection migrator 410, the example network stack storage 415, the example routing state migrator 420 and/or the example routing state storage 425 are shown in FIGS. 6 and 8-9. In these examples, the machine readable instructions represented by each flowchart may comprise one or more programs for execution by a processor, such as the processor 1512 shown in the example processing system 1500 discussed below in connection with FIG. 15. Alternatively, the entire program or programs and/or portions thereof implementing one or more of the processes represented by the flowcharts of FIGS. 6 and 8-9 could be executed by a device other than the processor 1512 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 6 and 8-9 may be implemented manually. Further, although the example machine readable instructions are described with reference to the flowcharts illustrated in FIGS. 6 and 8-9, many other techniques for implementing the example methods and apparatus described herein may alternatively be used. For example, with reference to the flowcharts illustrated in FIGS. 6 and 8-9, the order of execution of the blocks may be changed, and/or some of the blocks described may be changed, eliminated, combined and/or subdivided into multiple blocks.

As mentioned above, the example processes of FIGS. 6 and 8-9 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6 and 8-9 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Example machine readable instructions 600 that may be executed to implement the BGP session migration using the router grafting processor 400 of FIG. 4 are represented by the flowchart shown in FIG. 6. For convenience, and without loss of generality, execution of the machine readable instructions 600 is described in the context of the example of FIGS. 5A-D. The machine readable instructions 600 begin execution at block 610 at which the grafting controller 405A associated with the migrate-from router 510A provides the BGP session configuration state 530A of the BGP session being migrated to the grafting controller 405B of the migrate-to router 510B. Each BGP session endpoint (such as the endpoints 505 and 510A) has configuration state information used to establish the BGP session with the corresponding remote endpoint (with a given IP address and AS number) and to apply policies for filtering and modifying route announcements. In some examples, a network operator and/or an automated management system configure a BGP session endpoint by applying configuration commands at the router's command-line interface or by uploading a new configuration file. The router (such as the routers 505 and 510A) stores the configuration information in various internal data structures.

Rather than exporting these internal data structures, in some examples the grafting controller 405A is implemented with a realization that the BGP session configuration state is captured in a well-defined format in a configuration file. As such, the grafting controller 405A dumps the configuration file for the migrate-from router 510A, extracts the commands relevant to the BGP session being migrated, and provides these commands to the migrate-to router 510B. The grafting controller 405B at the migrate-to router 510B, in turn, applies these commands to initialize the BGP session at the migrate-to router 510B, after any appropriate translation to account for vendor-dependent differences in the command syntax. In this way, the migrate-to router 510B is able to create its own internal data structures for the BGP session configuration information.

However, the migrate-to router 510B is not yet ready to assume responsibility for the BGP session being migrated. To indicate that migration is not yet complete, the BGP state machine is extended to include an "inactive" state, during which the migrate-to router 510B can create data structures and import configuration and routing state information for the BGP session being migrated without attempting to communicate with the remote endpoint 505. The grafting controller 405B later causes the migrate-to router 510B to transition from the BGP "inactive" state to a BGP "established" state at an appropriate phase in the migration process, as described in greater detail below.

Returning to FIG. 6, at block 620 the routing state migrator 420A associated with the migrate-from router 510A exports the BGP routing state information 515A for the BGP session being migrated. The migrate-from router 510A maintains a variety of routing state information for BGP session endpoints, such as for the BGP session with the session endpoint 505. For the purposes of BGP session migration in accordance with the example techniques disclosed herein, it is sufficient to consider the RIBs stored at the migrate-from router 510A, whereas the other BGP routing state information (such as the state of the BGP state machine, the BGP timers, the BGP statistics, etc.) for the session undergoing migration may be re-initialized at the migrate-to router 510B, as described below.

In some examples, the routing state information to be exported for a BGP session undergoing migration is stored in the RIB tables Adj-RIB-in and Adj-RIB-out. In some examples, the routing state migrator 420A dumps these RIBs at the migrate-from router 510A to prepare for providing this information for importing at the migrate-to router 510B. Although the RIBs may be represented differently on different router platforms, the information the RIBs store is standardized as part of the BGP protocol. In many router implementations, the RIB data structure is maintained apart from the rest of the routing software, and many routers support commands for dumping the current RIBs. Also, although the RIB dump formats can vary by vendor, de facto standards, such as the multi-threaded routing toolkit (MRT) format, can be employed to simplify RIB exporting and importing.

Each BGP session endpoint also stores information about the BGP state machine. In some examples, the routing state migrator 420A foregoes migrating a BGP state machine's state because, for the purposes of BGP session migration, the BGP session is either "established" or it is not established. If the BGP session is in one of the not-established states, the grafting controllers 405A-B can simply close the session at the migrate-from router 510A and start the migrate-to router 510A in the idle state. This does not trigger any transient disruption because the BGP session is not active. If the session at the migrate-from router 510A is "established," the grafting controller 405B starts the migrated BGP session at the migrate-to router 510B in the "inactive" state, and the BGP state machine at the migrate-to router 510B proceeds from this state.

Routers also maintain various timers for BGP sessions, many of which are vendor-dependent. For example, some routers use an MRAI (minimum route advertisement interval) timer to pace the transmission of BGP update messages. This is a local operation at one endpoint of the BGP session, which does not require any agreement with the remote endpoint. Other common timers include a keep-alive interval timer that drives the periodic sending of heartbeat messages, and a hold timer for detecting missing keep-alive messages from the remote endpoint. However, missing a single keep-alive message, or sending the message slightly early or late, will not erroneously disrupt the BGP session being migrated because routers typically wait for multiple (e.g., three) missed keep-alive messages before tearing down the session. As such, the routing state migrator 420A does not migrate BGP timer values and, instead, the migrate-to router 510B initialize its BGP timer(s) to any appropriate (e.g., default) value(s).

Routers can also maintain statistics about each BGP session and/or one or more individual routes associated with a BGP session. These statistics, which can be useful for network monitoring, are unnecessary for correct operation of the router. Additionally, these statistics are often vendor dependent and not well modularized in router software implementations. As such, in some examples the routing state migrator 420A does not migrate these statistics from the migrate-from router 510A. In such examples, the migrate-to router 510B can initialize its own statistics for the BGP session undergoing migration as if the migrate-to router 510B was establishing a new BGP session.

Returning to FIG. 6, at block 630 the physical connection migrators 410A and 410B migrate, from the migrate-from router 510A to the migrate-to router 510B, the TCP connection and IP link supporting the BGP session undergoing migration. To avoid relying on support from the remote endpoint, the migrate-to router 510B uses the same IP addresses, as well as sequence and acknowledgment numbers, that the migrate-from router 510A was using for the BGP session being migrated. In BGP, IP addresses are used to uniquely identify the BGP session endpoints and not the router as a whole. Further, it is assumed that the link between the remote endpoint 505 and the migrate-from router 510A (or the migrate-to router 510B) is a single hop IP network where the IP address is not used for reachability, but only for identification. As such, the session endpoint 505 can retain its address (and sequence and acknowledgment numbers) when the BGP session is migrated (or grafted) from the migrate-from router 510A to the migrate-to router 510B. In other words, the single IP address identifying the migrating BGP session can be disassociated from the migrate-from router 510A and associated with the migrate-to router 510B. To accomplish this, the physical connection migrators 410A and 410B migrate the local state associated with the TCP connection from one router to another.

During TCP connection migration, the network can endure a brief period of time when neither router 510A-B is responsible for the TCP connection. TCP has its own retransmission mechanism that ensures that the remote endpoint 505 retransmits any unacknowledged data. So long as the transient outage is short, the TCP connection (and, thus, the BGP session) remains established. In some examples, TCP implementations can tolerate a long period of time (e.g., at least 100 seconds) without receiving an acknowledgment, which is longer than the BGP session migration techniques disclosed herein are expected to take to complete. Furthermore, the amount of TCP state to be migrated between the routers 510A-B is relatively small, and BGP session migration is expected to usually occur between two routers 510A-B that are close to one another geographically, leading to relatively fast TCP migration times.

In some examples, the underlying IP link is migrated (e.g., by changing the path in the underlying programmable transport network) close in time to migration of the TCP connection state to reduce the transient disruption in connectivity. Still, the network may have to tolerate a brief period of inconsistency during which, for example, the TCP connection state has moved to the migrate-to router 510B while the traffic still flows via the migrate-from router 510A. During this transition period, the physical connection migrator 410A prevents the migrate-from router 510A from erroneously responding to TCP packets with a TCP RST packet that resets the connection. For example, the physical connection migrator 410A can configure the migrate-from router 510A to drop TCP packets sent to the BGP port (e.g., port 179) during this transition period. However, the migrate-from router 510A can still be permitted to deliver regular data traffic received during the transition period.

Returning to FIG. 6, at block 640 the routing state migrators 420A and 420B migrate, from the migrate-from router 510A to the migrate-to router 510B, the BGP routing state for the BGP session undergoing migration. For example, after migration of the IP link and TCP connection are complete, the grafting controller 405B causes the migrate-to router 510B to transition from the BGP "inactive" state to the BGP "established" state for the BGP session undergoing migration. Then, the routing state migrator 420B associated with the migrate-to router 510B can begin importing the RIBs received from the routing state migrator 420A associated with the migrate-from router 510A. However, the import process is not as simple as merely loading the RIB entries into the internal data structures of the migrate-to router 510B. For example, the migrate-from router 510A and the migrate-to router 510B could have different views of the "best" route for each routing destination prefix, as illustrated in the example of FIG. 7.

Figure 7:
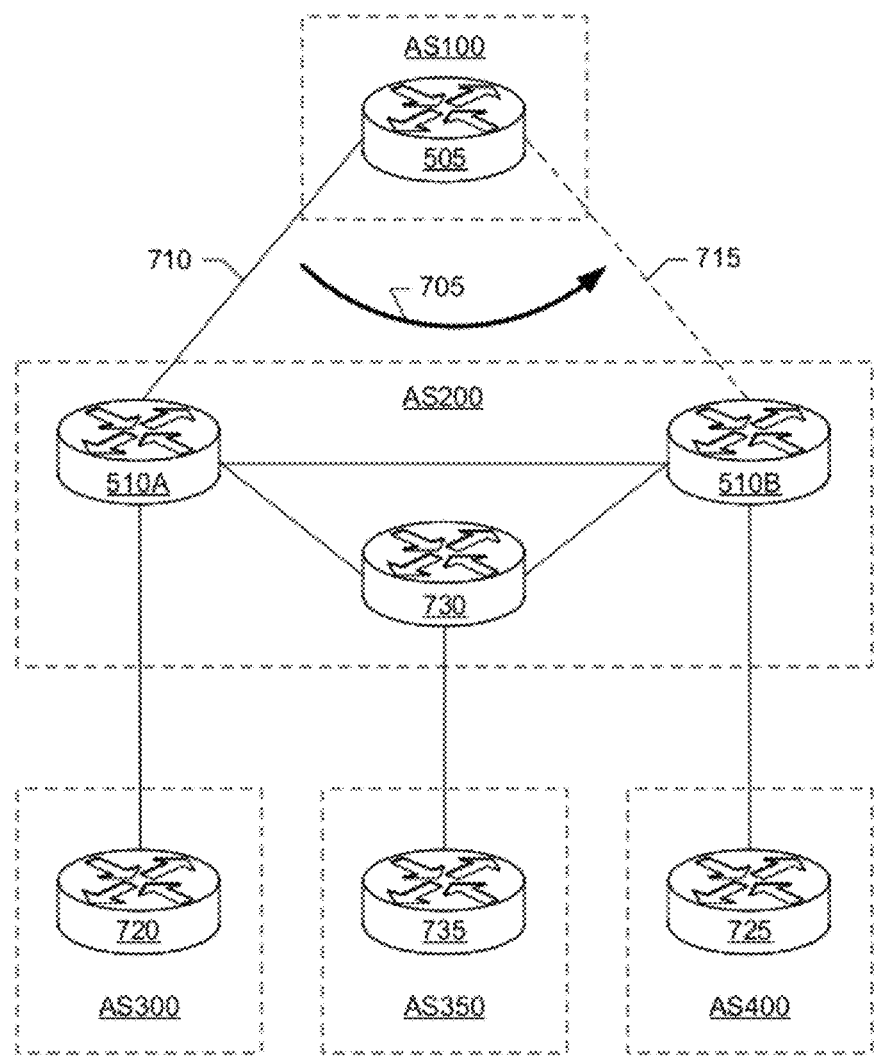
FIG. 7 is a block diagram to an example system that illustrates BGP routing state migration as performed by the example machine readable instructions of FIG. 6.

In the example of FIG. 7, before BGP session migration (represented by a directed line 705 in FIG. 7), router 510A reaches the prefixes announced by router 505 via a direct link 710, whereas router 510B reaches the prefixes announced by router 505 via router 510A. However, after BGP session migration, router 510A reaches the prefixes of router 505 via router 510B, whereas router 510B reaches the prefixes of router 505 via a direct link 715. Also, suppose routers 720 and 725 connect to a common prefix. Before BGP session migration, router 505 follows the AS path "AS100-AS200-AS300" (e.g., through router 720) to reach that destination prefix, whereas after BGP session migration the router 505 follows the AS path "AS100-AS200-AS400" (e.g., through router 725) to reach that same destination prefix. To determine the new routing paths to reach these various destinations, the migrate-from and migrate-to routers 510A and 510B rerun their respective BGP decision procedures based on the BGP routes migrated from the migrate-from router 510 to the migrate-to router 510B, and then disseminate any routing changes to neighboring routers.

To make the BGP migration process transparent to the remote endpoint 505, the routing state migrator 420B starts up a new BGP session at the migrate-to router 510B, while the routing state migrator 420A causes the migrate-from router 510A to temporarily emulate the role of the remote endpoint 505 by announcing the routes learned from the remote endpoint 505. For example, the routing state migrator 420A can cause the migrate-from router 510A to replay the routers stored in the Adj-RIB-in table associated with the router 505 (e.g., which are the routes previously announced by the router 505 to the migrate-from router 510A) to the migrate-to router 510B. The migrate-to router 510B stores these routes and reruns its BGP decision process to compute any new "best" routes to prefixes that the router 505 is announcing. If the resulting new "best" routes are different from any previous BGP "best" routes, the migrate-to router 510B causes BGP update messages for these changed routes to be sent to other routers within the AS (e.g., such as router 730) and, sometimes, to external routers (such as routers 720, 725 and/or 735). If the attributes of a route (e.g., such as the AS-PATH) do not change, BGP updates may not be sent to one or more routers in one or more autonomous systems (e.g., because, from their point of view, the route has not changed), thereby reducing the overhead that BGP migration via router grafting as disclosed herein imposes on a global BGP routing system.

In some examples, the migrate-to router 510B also updates the remote endpoint router 505 of the BGP session undergoing migration with the new BGP "best" routes selected by the migrate-to router 510B. In at least some scenarios, the remote endpoint router 505 has already learned routes from the migrate-from router 510A, but the change in topology might change some of those routes. As such, the migrate-to router 510B runs the BGP decision process to compare its currently-selected "best" routes to the routes learned from the migrate-from router 510A. If the best routes change, the migrate-to router 510B sends an appropriate BGP update message to its neighbors, including the remote endpoint router 505, similar to the operations the migrate-to router 510B would perform upon receiving a route update from any of its neighbors. It is expected that migrate-from router 510A and the migrate-to router 510B would often have the same BGP best route for most prefixes, especially if routers 510A and 510B are relatively close to each other in the IGP topology. Accordingly, it is expected that the migrate-to router 510B will usually not change its "best" routes and, thus, will usually send few, if any, update messages to the remote endpoint router 505.

BGP session migration using router grafting as implemented, for example, by the router grafting processor 400 and/or the example machine readable instructions 600 should not compromise the correct functioning of the network. The following discussion demonstrates how BGP session migration using router grafting as disclosed herein preserves correct control plane routing state and correct data plane packet forwarding in a network, even when unexpected routing changes occur in the middle of the grafting process.

Routing changes can, and do, happen at any time in a network supporting BGP. In some examples, BGP routers receive up to millions of BGP update messages per day, and these BGP update messages could arrive at any time during the grafting process. For example, a BGP update message could arrive (1) while the migrate-from router 510A dumps its routing state, (2) while the TCP connection and underlying link are migrating from the migrate-from router 510A to the migrate-to router 510B, and/or (3) while the migrate-to router 510 imports the routing state and updates its routing decisions. BGP session migration using router grafting as disclosed herein can correctly handle BGP update messages received at any of these times.

For example, if a BGP update message is received while the migrate-from router 510A is dumping the in-memory RIB, a goal is to have the in-memory RIB be consistent with the RIB that is dumped as part of migration. Here, router grafting can take advantage of the fact that the dumping process and the BGP protocol work on a per-prefix basis. For example, consider an Adj-RIB-in table with three routes p1, p2 and p3 corresponding to three prefixes, of which p1 and p2 have already been dumped by the router grafting process. If an update p3' (for the same prefix as p3) is received, the in-memory RIB can be updated since it corresponds to a prefix that has not been dumped. Thus, to prevent dumping a prefix while it is being updated, the routing state migrator 420A locks the entry in the RIB for the route being updated until processing of the BGP update message is complete. As another example, if an update for p1' (for the same prefix as p1) is received after p1 has already been dumped, processing the received update and updating the in-memory RIB without updating the dumped image will cause the two RIBs to be inconsistent. To avoid having this inconsistency, delaying processing of the update is an option, but that would also delay convergence. Instead, because BGP is an incremental protocol where a new update message implicitly withdraws a corresponding previous one, the routing state migrator 420A treats the dumped RIB as a sequence of update messages and appends p1' to the end of the dumped RIB to keep it consistent with the in-memory RIB In another example scenario, BGP update messages may be sent while the TCP connection and the underlying link are migrating from the migrate-from router 510A to the migrate-to router 510B. If a message is sent by the remote endpoint 505 during this transitory period, the message is not delivered and is correctly retransmitted after the link and TCP connection come up at the migrate-to router 510B. If an update message is sent by another router to the migrate from router 510A over a different BGP session, there is no problem because the migrate-from router 510A is no longer responsible for the recently re-homed BGP session. Therefore, the migrate-from router 510A can safely continue to receive, select, and send routes. If an update message is sent by another router to the migrate-to router 510B over a different BGP session, the migrate-to router 510B can install the route in its Adj-RIB-in for that session and, if needed, update its selection of the best route, similar to when a route is received before the migration process.

Another example scenario to consider is when the migrate-to router 510B receives a BGP update message while importing the routing state from the migrate-from router 510A for the re-homed session. Whether the BGP update message is received from the remote endpoint 505 or another router, if the route is for a prefix that was already imported, there is no problem because the migration of that prefix is complete. However, if the BGP update message is for a prefix that has not already been imported, only messages from the remote endpoint router 505 need special care. This is because BGP is an asynchronous protocol that does not depend on the relative order of processing for messages learned from different neighbors. However, an update message from the remote endpoint 505 should be processed after this route is imported, but waiting to process the update message can increase processing complexity. Instead, because the update implicitly withdraws the previous announcement (which is in the dump image), in some examples the routing state migrator 420B associated with the migrate-to router 510B marks the affected RIB entry to indicate that there is a route update that is more recent than the route in the dump image. In this way, the routing state migrator 420B can skip importing any entries in the dump image for which more recent route updates have been received.

As noted above, BGP session employing router grafting as disclosed herein should not impact correct data plane packet forwarding in a network. This is certainly the case when moving a BGP session between blades in the same router, because the underlying physical link does not move and the "best" routes do not change. As such, the forwarding table does not change, and data packets travel as they did before grafting took place. In other words, the data traffic continues to flow uninterrupted.

A more challenging example scenario involves grafting a BGP session from the migrate-from router 510B to the migrate-to router 510B, where these two routers do not have the same BGP routing information and do not necessarily make the same decisions. Because the TCP connection and link are migrated before the migrate-to router 510B imports the routing state, the remote endpoint 505 briefly forwards packets through the migrate-to router 510B based on BGP routes learned from the migrate-from router 510A. Since BGP route dissemination within the AS (typically implemented using iBGP) ensures that each router learns at least one route for each destination prefix, the two routers 510A and 510B will learn routes for the same set of destinations. Therefore, the undesirable situation where the remote endpoint 505 forwards packets that the migrate-to router 510B cannot handle does not occur.

Although data packets are forwarded correctly, the end-to-end forwarding path may temporarily differ from the control-plane messages. For example, in FIG. 7, data packets sent by the endpoint router 505 to a common prefix to which routers 720 and 725 connect could start traversing the path through AS 400 while the control plane of the endpoint router 505 still assumes that the AS path goes through AS 300. These kinds of temporary inconsistencies are a normal occurrence during the BGP route-convergence process, and do not disrupt the flow of traffic. Once the migrate-to router 510B finishes importing the routes, the remote endpoint 505 will learn the new best route and the control-plane and data-plane paths will agree again.

Correct handling of data traffic should also consider the packets routed toward the remote endpoint 505. During the grafting process, routers throughout the AS forward these packets to the migrate-from router 510A until they learn about the routing change (e.g., pointing to the new egress point for reaching the destinations associated with the endpoint 505). Because the migrate-from router 510A knows where the link, TCP connection, and BGP session have moved, it can direct packets in flight there through temporary tunnels established between the migrate-from router 510A and the migrate-to router 510, as appropriate.

Example machine readable instructions 800 that may be used to implement migrate-from router processing in the router grafting processor 400 are illustrated in FIG. 8. Additionally, example machine readable instructions 900 that may be used to implement migrate-to router processing in the router grafting processor 400 are illustrated in FIG. 9. Because the machine readable instructions 800 and 900 perform counterpart processing, their execution is described in parallel. Also, for clarity and without loss of generality, the machine readable instructions 800 are described from the perspective of implementation in the router grafting processor 400A associated with the migrate-from router 510A of FIGS. 5A-D, whereas the machine readable instructions 900 are described from the perspective of implementation in the router grafting processor 400B associated with the migrate-to router 510B of FIGS. 5A-D.

Turning to FIGS. 8 and 9, at block 810 the grafting controller 405A dumps the BGP configuration file for the migrate-from router 510A (e.g., instead of dumping its internal data structures). The grafting controller 405A (e.g., implemented as a graft daemon) then extracts BGP session configuration from the configuration file of the migrate-from router 510A, including the rules for filtering and modifying route announcements. At blocks 910-920 of FIG. 9, the configuration commands extracted at the migrate-from router 510A by the grafting controller 405A are applied to the migrate-to router 510B by the grafting controller 405B (e.g., implemented as a graft daemon). For example, at block 910 the grafting controller 405B configures the BGP state machine of the migrate-to router 510B to be in an "inactive state." Then, at block 920 the grafting controller 405B applies the configuration commands for the BGP session being migrated, possibly after translation as described above, to the migrate-to router 510B.

As noted above, in some examples the router grafting processor 400 includes a routing state migrator 420 implemented by one or more Quagga routing software modules. In such examples, the router grafting processor 400 can include a parser for Quagga's commands to enable configuring of BGP sessions. For example, to configure the migrate-to router 510B in the "inactive" state before migrating the TCP connection, the following configuration command can be added to the Quagga command-line interface:

neighbor w.x.y.z inactive

The preceding command triggers the migrate-to router 510B to create the internal data structures for the BGP session undergoing migration, without attempting to open or accept a socket with the remote endpoint router 505.

After the migrate-to router 510B is configured, at block 820 the grafting controller 405A initiates exporting of the routing state at the migrate-from router 510A. For example, the following configuration command can be added to the Quagga command-line interface, which can be invoked by the grafting controller 405A (e.g., implemented as a grafting daemon) to initiate the export process:

neighbor w.x.y.z migrate out

When the preceding command is executed, the routing state migrator 420A (e.g., implemented as modified Quagga software module(s)) traverses the internal data structures and dumps the appropriate BGP routing state for the BGP session undergoing migration (e.g., such as Adj-RIB-in table, selected routes in the loc-RIB table, etc.) to a file.

After the routing state is dumped at the migrate-from router 510A, at block 830 the grafting controller 405A invokes the physical connection migrator 410A (e.g., by invoking an export socket function as part of a SockMi API) to migrate the TCP state. In an example in which the physical connection migrator 410 is implemented, at least in part, by SockMI, the export socket function makes an ioctl call to the kernel module, passing the socket's file descriptor. The ioctl call causes a Linux kernel module to interact with Linux's internal data structures, remove the TCP connection from the kernel, and write the socket state to a character device. The socket state includes the protocol state (e.g., the current sequence number) and data buffers (e.g., the receive queue and the transmit queue of packets sent, but not acknowledged). When this socket state is written, the kernel module sends a signal to the grafting controller 405A (e.g., implemented as a graft daemon) on the migrate-from router 510A, which causes the grafting controller 405A to read the TCP connection state from the character device and send it to the grafting controller 405B (e.g., implemented as a graft daemon) of the migrate-to router 510B.

Next, at block 930 the grafting controller 405B (e.g., implemented as a graft daemon) invokes the physical connection migrator 410B to initiate importing of the TCP state at the migrate-to router 510B. For example, upon receiving the state from the migrate-from router 510A, the grafting controller 405B at the migrate-to router 510B notifies the routing state migrator 420B (e.g., implemented as modified Quagga software module(s)) that it is about to import state for the "inactive" session corresponding to the BGP session undergoing migration. For example, the following configuration command can be added to the Quagga command-line interface to perform this notification:

neighbor w.x.y.z migrate in

When the preceding command is executed, the routing state migrator 420B invokes the physical connection migrator 410B (e.g., by invoking an import socket function as part of a SockMi API). In an example in which the physical connection migrator 410 is implemented, at least in part, by SockMI, the import socket function blocks until a TCP connection is imported. During this time, the grafting controller 405B (e.g., implemented as a grafting daemon) makes an ioctl to the SockMi kernel module. The grafting controller 405B then passes the TCP connection state to a character device which is read by the kernel module. The SockMi kernel module accesses the Linux data structures to add a socket with that TCP connection state, which unblocks the import socket function.

Next, at blocks 840 and 940 the underlying IP link is migrated from the migrate-from router 510A to the migrate-to router 510B. For example, the grafting controller 405B (e.g., implemented as a graft daemon) of the migrate-to router 510B triggers the migration of the underlying IP link. As described above, migration of the IP link includes removing the migrating session's IP address from the migrate-from router 510A, adding the IP address to the migrate-to router 510B, and switching the layer-two link.

When importing of the TCP connection is complete (e.g., and the import socket function at the migrate-to router 510B is unblocked), at blocks 850 and 950-970 the BGP routing state is imported at the migrate-to router 510B. For example, at block 950 the grafting controller 405B causes the migrate-to router 510B to transition to the established state for the BGP session being migrated. In some examples, at block 850 the migrate-from router 510A emulates the session endpoint 505 and announces the routes stored in the RIB table(s) exported at block 820, which are received and processes as announced BGP route at blocks 960 and 970. In other examples, the routing state migrator 420B (e.g., implemented as modified Quagga software module(s)) at the migrate-to router 510B reads the routing state stored in a file received by the grafting controller 405B from the grafting controller 405A of the migrate-from router 510A to obtain the exported RIB table(s). Then, the routing state migrator 420B reads the exported Adj-RIB-in table from the stored file and, similar to how the migrate-to router 510B processes received BGP route updates messages from other routers at a socket and then calls a function to handle the update, the routing state migrator 420B invokes this same function to process the routes included in the Adj-RIB-in. At blocks 980 and 990, the routing state migrator 420B compares the RIBs received from the migrate-from router 510A (e.g., and possibly its own previous RIBs) to the updated RIBs generated at the migrate-to router 510B based on the BGP routing state information imported from the migrate-from router 510A. For routes that have changed, the migrate-to router 510B will send BGP route updates to the appropriate peers (e.g., such as the routing endpoint 505 and/or other routers 720-735).

As described above, migrating (or grafting) a BGP session can involve incrementally updating the remote endpoint of the BGP session, as well as the other routers in the AS. The following improvements can be used to reduce the traffic and processing load imposed on routers not directly involved in the grafting process. For example, improvements are described that can keep routers from sending unnecessary updates to their eBGP neighbors. Improvements to substantially eliminate a majority of iBGP messages are also described. Further, improvements related to intra-cluster router scenarios where the routes do not change are described.

Importing routes at the migrate-to router, and withdrawing routes on the migrate-from router, can trigger a flurry of update messages to other BGP neighbors. Referring to FIG. 7, consider an example where, before BGP session migration, router 505 had announced 192.168.0.0/16 to router 510A, which in turn announced the route to router 510B and router 720. After BGP session migration, the following events occur: (i) the migrate-from router 510A removes the 192.168.0.0/16 route announced from the endpoint router 505; and (ii) the migrate-to router 510B adds the 192.168.0.0/16 route announced from the endpoint router 505. Absent any special coordination, these two events could happen in either order.

For example, if the migrate-from router 510A removes this route before the migrate-to router 510B imports it, then the eBGP neighbors of the migrate-from router 510A (such as router 720) may receive a withdrawal message, or briefly learn a different best route (e.g., if the migrate-from router 510A has other candidate routes), only to have the migrate-from router 510A reannounce the route upon (re)learning it from the migrate-to router 510B. Alternatively, if the migrate-to router 510B adds the route before the migrate-from router 510A sends the withdrawal message to the router 720, then the migrate-from router 510A may have both a withdrawal message and the subsequent (re)announcement queued to send the router 720, perhaps leading to redundant BGP messages. In the first example, the router 720 may temporarily have no route at all, and in the second example the router 720 may receive redundant messages. In both examples, these effects are temporary, but should be avoided if possible.

To avoid the foregoing undesirable events during BGP session migration, rather than deleting this route, the migrate-from router 510A can mark the route as "exported," with the knowledge that, if this route should remain the best route, the migrate-from router 510A will soon (re)learn it from the migrate-to router 510B. For example, suppose the 192.168.0.0/16 route announced from the endpoint router 505 is the only route for this destination prefix. In this example, the migrate-from router 510A would certainly (re)learn this route from the migrate-to router 510B, and could forgo withdrawing and reannouncing the route to its other neighbors. Of course, if the migrate-from router 510A does not receive the announcement (either after some period of time or implicitly through receiving an update with a different route for that prefix), then the migrate-from router 510A can proceed with deleting the exported route.

Similar situations can occur on the eBGP sessions of the other routers in the AS (e.g., such as the router 730). This is because these other routers are to be notified (e.g., via iBGP) to no longer go through the migrate-from router 510A for the routes learned over the migrating session associated with the endpoint router 505. Therefore, the migrate-from router 510A is to send out withdrawal messages to its iBGP neighbors and the migrate-to router 510B is to send out announcements to its iBGP neighbors. This may result in the other routers in the AS (e.g., the router 730) temporarily withdrawing a route, temporarily sending a different best route, or sending a redundant update to their eBGP neighbors. Because of this, an improvement involves having the migrate-from router 510A send a marked list of routes to each of its iBGP neighbors with a notification that these routes have migrated to the migrate-to router 510B. The list can be simply a list of prefixes, not the associated route attributes. Such a list is expected to be relatively small in size. With this list, the other routers in the AS can mark routes as being exported and may be able to forgo withdrawing and reannouncing this route, as described above.

While using unmodified iBGP is sufficient for dealing with the change in topology brought about by BGP session migration as described herein, it may be possible to further reduce the impact migration has on the iBGP sessions. For example, because the route-selection policy is likely to be consistent throughout an ISP's network, it may be possible to reduce the number of update messages sent by extending iBGP as follows. When the migrate-from router 510A and migrate-to router 510B select the same routes, BGP session migration does not change the routing decisions. In this example, iBGP updates can be suppressed (e.g., BGP updates caused by the migrate-from router 510A withdrawing the route and the migrate-to router 510B announcing the route can be suppressed). When the migrate-from router 510A and the migrate-to router 510B select different routes, it is likely due to differences in IGP distances. For the migrate-to router 510B, BGP session migration can cause the routes learned from the remote endpoint router 505 to become directly learned routes, as opposed to some distance away. Therefore, the migrate-to router 510B may now prefer those routes (except, for example, when the migrate-to router's currently selected route is also directly learned). This change in route selection can cause the migrate-to router 510B to send updates to its iBGP neighbors notifying them of the change. However, because it is more common to change routes, it is possible to reduce the number of updates that need to be sent with a modification to iBGP where updates are sent when the migrate-to router 510B keeps a route instead of when it changes a route. Other routers will be notified of the migration and will assume the routes being migrated will be selected, unless told otherwise.

Re-running the route-selection processes can be important as migration can change the network topology and, therefore, can change the best route to a destination. However, when migrating a BGP session within a cluster router, the topology does not change, and therefore it may be possible to significantly reduce processing. For example, a selected best route will be a consistent selection on each blade in a cluster router. Therefore, in at least some examples, BGP session migration can be performed with the internal data structures being adjusted, but without the BGP decision process being re-run and with no external update messages being sent. In some examples, no internal messages are sent either. With a modified iBGP used for communication between router processor blades, the next hop field is the next router, not the next processor blade. That is, iBGP messages are used to exchange routes learned externally and do not affect how packets are forwarded internally. Therefore, upon migration, there is no need to send an update as the routes learned externally have already been exchanged.

While exchanging messages and running the decision process can be eliminated, transferring the routing state from the exporting blade to the importing blade is still to be performed. The blade that is responsible for a particular BGP session maintains the local RIB that has the routes learned over that session. While some of these routes may have been previously announced by the migrate-from blade, some may not have been. Therefore, the Adj-RIB-in for the migrating session is provided to the migrate-to blade to determine the routes learned over the migrating BGP session, as well as which subset of these routes the migrate-from blade announced while handling this session.

Figure 10:
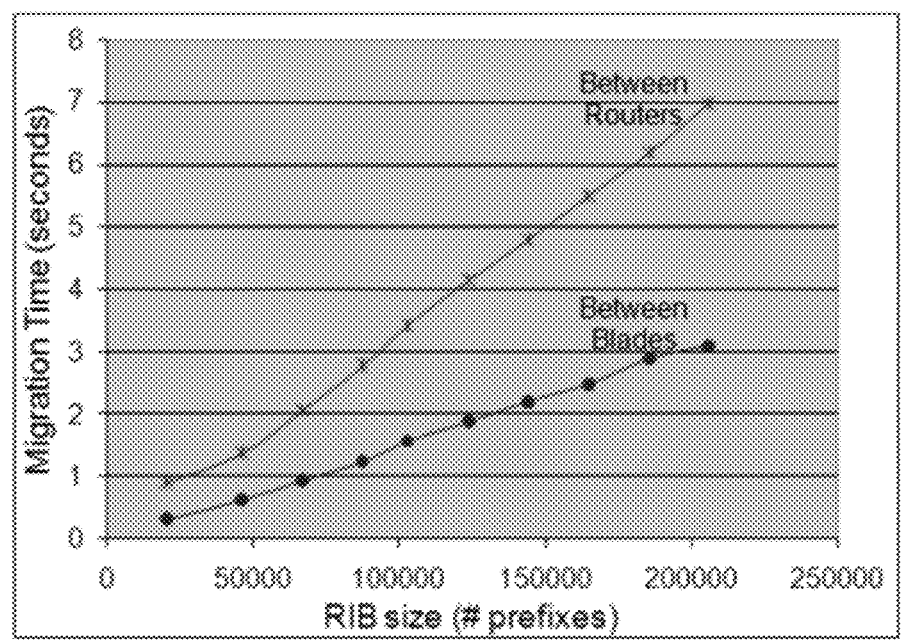
FIGS. 10-14 illustrate example performance results for the router grafting processor of FIG. 4.
Figure 11:
Figure 12:
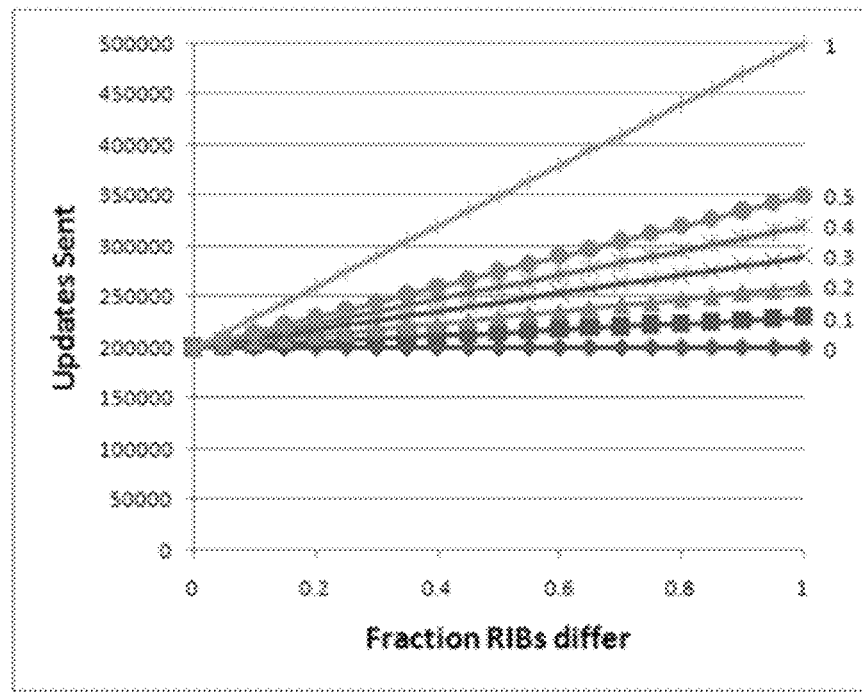
Figure 13:
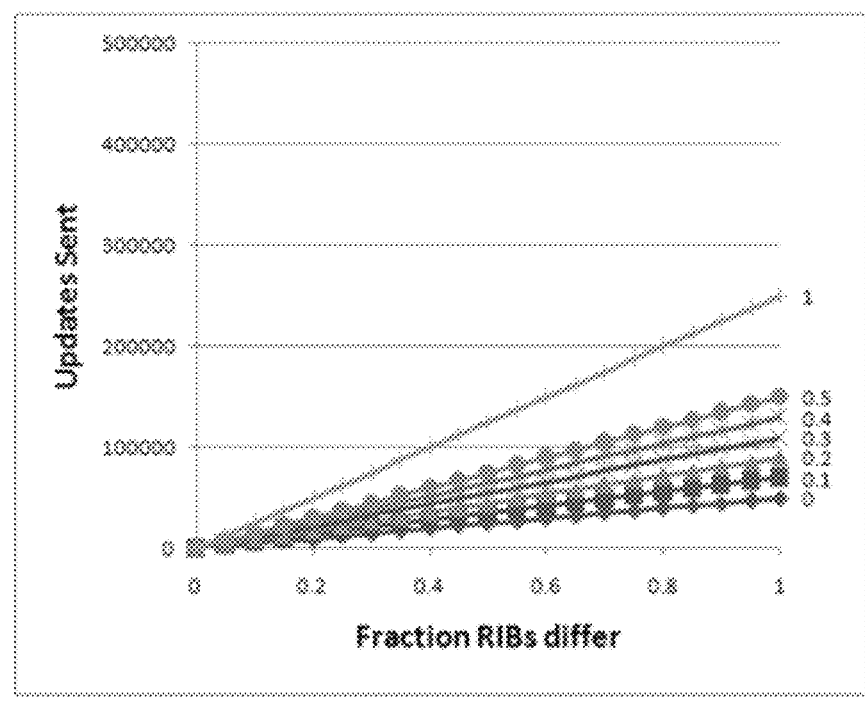
Figure 14:
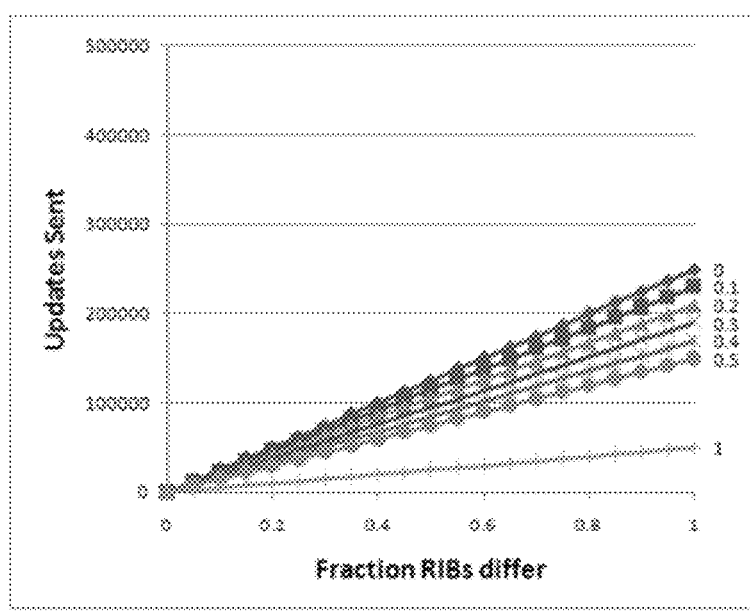

FIGS. 10-14 illustrate example performance results for the example BGP session migration techniques described herein. For example, FIGS. 10-11 illustrate performance as a function of migration (or grafting) time and CPU utilization on the migrate-from and migrate-to routers. FIGS. 12-14 illustrate performance of the improvements described above to reduce the number of update messages sent to and received by other routers during BGP session migration.

An experiment to measure the impact of BGP session grafting on the migrate-from and migrate-to routers was performed using the topology shown in FIG. 7, but supplemented with a router adjacent to the endpoint router 505 (and in a different AS) and another router adjacent to the migrate-to router 510B (also in a different AS). These two extra routers were fed a BGP update message trace to fill the RIB of the migrate-to router 510B and the RIB of the endpoint router 505 with routes that have the same set of prefixes, but different paths. The experiment was performed on servers with 3 GHz processors and 2 GB RAM.

The time it takes to complete the migration process is a function of the size of the routing table. The larger the routing table is, the larger the state that is to be transferred and the more routes that are to be compared. To capture this relationship, the RIB size was varied by replaying multiple traces. The performance results, which are shown in FIG. 10, include both the case where migration occurs between routers (e.g., and, thus, the migrate-to router is to run the BGP decision process) and the case where migration is between blades (e.g., and, thus, the decision process does not need to run because the underlying topology is not changed). The "between blades" curve, then, illustrates the time required to transfer the BGP routes and import them into the internal data structures. Note that these results do not imply that TCP needs to be able to handle this outage where packets go unacknowledged for the entire duration of the migration, because the TCP migration process takes less than a millisecond. Instead, when compared to re-homing a customer today, where there is downtime measured in minutes, the migration time is small. Furthermore, in the illustrated example AS100 and AS200 have a peering agreement and, therefore, the actual migration time could be less if AS100 were a customer of AS200 (because AS100 would announce fewer routes to AS200).

CPU utilization during the grafting process was also examined. The BGP process on the migrate-from router experienced only a negligible increase in CPU utilization for dumping the BGP RIBs. The migrate-to router is to import the routing entries and compare routing tables. For each prefix in the received routing information, the migrate-to router is to perform a lookup to find the routing table entry for that prefix. FIG. 11 shows the CPU utilization at 0.2 second intervals, for the case where the RIB consists of 200,000 prefixes. There are three things to note. First, the CPU utilization is roughly constant. This is perhaps due to the implementation where the data is received, placed in a file, then iteratively read from the file and processed before reading the next, which keeps the CPU utilization at only a fraction as computation is mixed with reads from disk. Second, the CPU utilization is the same for both migrating between routers and migrating between blades. The case of migrating between routers merely takes longer because of the additional work involved in running the BGP decision process. Third, migration can be run as a lower priority task and use less CPU but take longer, thereby preventing the migration from effecting the performance of the router during spikes in routing updates, which commonly results in intense CPU usage during the spikes.

While the impact on the migrate-from and migrate-to routers (e.g., routers 510A-B) is important, another important metric is the impact on the routers not involved in the migration, including other routers within the same AS as well as the eBGP neighbors. If the overhead of grafting is relatively contained, network operators could more freely apply the technique to simplify network-management tasks.

The remote endpoint router (e.g., router 505) experiences an overhead directly proportional to the number of additional BGP update messages it receives. The number of update messages depends on how many best routes differ between the migrate-from and migrate-to router, because the migrate-to router is to send an update message for each route that differs. The number of differing routes depends on the proximity of the migrate-from and migrate-to routers. For example, if the two routers are in the same Point-of-Presence (PoP) of the ISP, perhaps few or no routes would change. In such a scenario, the processing impact on the remote endpoint router for the BGP session being migrated is expected to be small and, thus, is not examined further herein.

Other routers, both within the AS and in other autonomous systems, may be impacted by migration of a BGP session as described herein because these routers may have to learn new routes for the prefixes announced by the remote endpoint of the BGP session undergoing migration. To evaluate this overhead, the number of updates that would be sent as a function of the fraction of prefixes for which the migrate-from router had selected a different route than the migrate-to router was measured. The experiment used a fixed set of 100,000 prefixes. However, the results are directly proportional to the number of prefixes, and can therefore be scaled appropriately. For example, for migrating a customer link, the number of prefixes could be significantly smaller, whereas for migrating a peering link, the number of prefixes could be higher.

Performance results illustrating the impact of BGP session migration on other routers are shown in FIGS. 12-14 for three different scenarios. In particular, FIG. 12 illustrates the case of BGP session migration without any the improvements described above. FIG. 13 illustrates the case in which the improvement described above to reduce eBGP messages by exchanging lists identifying exported routes is employed. FIG. 14 illustrates the case in which the improvement described above to reduce iBGP messages by sending updates when the migrate-to router keeps a route instead of changes a route is employed. In the graphs, each line represents a fixed fraction of routes that change as a result of the grafting. For example, consider an example where the migrate-from router selects a particular route different than the migrate-to router. In this case, after migration, the migrate-to router may select the route the migrate-from router had selected (i.e., the migrate-to router changes its own route to what the migrate-from router had selected). Each line represents the fraction of times this change occurs. For example, the lines labeled 0.2 in FIGS. 12-14 correspond to 20% of the routes that differ will change to the routes previously selected by the migrate-from router.

There are several things of note from the graphs in FIGS. 12-14. For example, the direct (unimproved) approach to BGP session migration results in more messages being sent. In the case where the selected routes do not differ much, which is expected to be a likely scenario, the improved approaches result in fewer messages being sent. Additionally, when comparing FIG. 13 with FIG. 14, depending on what would be considered the more common scenario, either improvement could result in fewer updates. For FIG. 13, the assumption is that when the routes differ, the migrate-to router will not change to the routes the migrate-from router selected. For FIG. 14, the assumption is that when the routes differ, the migrate-from router will change to the routes the migrate-from router selected. The reason they would change is that the routes learned from the remote endpoint of the BGP session being migrated will now be directly learned routes, rather than via iBGP. It is likely that the policy of route selection is consistent throughout the ISPs network, and therefore differences will be due to IGP distances and changing the router will change those routes to be more preferable. The performance results of FIGS. 12-14 also illustrate that migration can be performed with minimal disruption to other routers in the likely scenario where there are few differences in routes selected.

Figure 15:
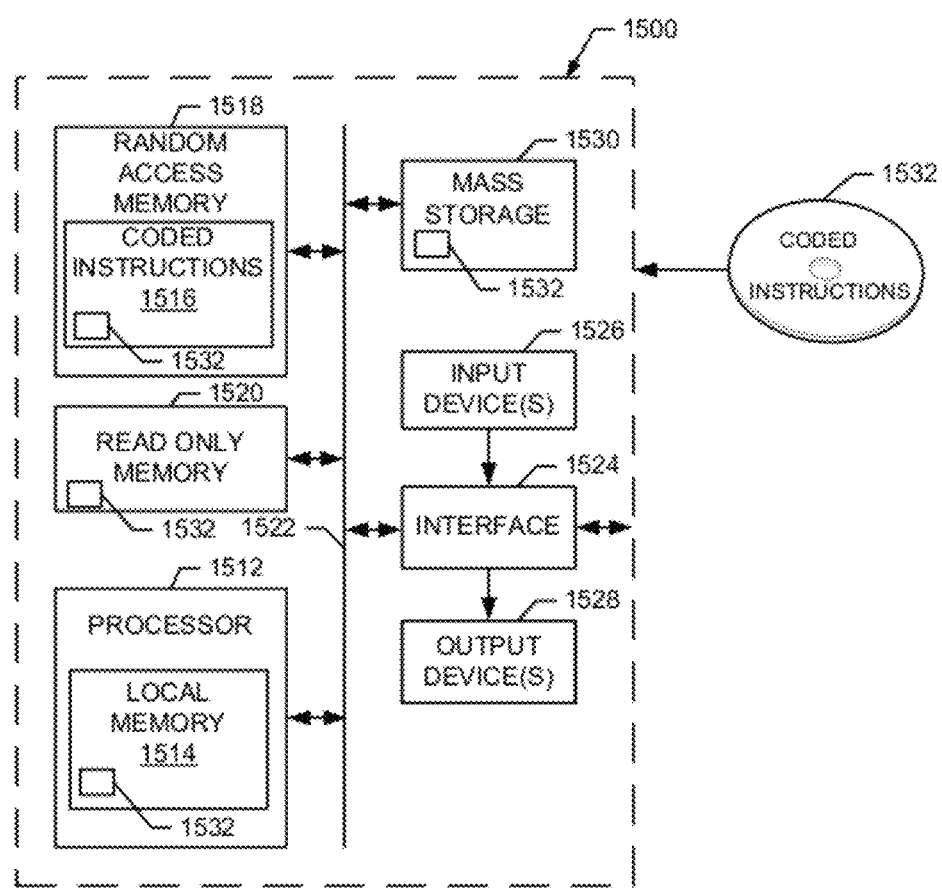
FIG. 15 is a block diagram of an example processing system that may execute the example machine readable instructions of FIGS. 6, 8 and/or 9 to implement the example router grafting processor of FIG. 4.

FIG. 15 is a block diagram of an example processing system 1500 capable of implementing the apparatus and methods disclosed herein. The processing system 1500 can be, for example, a server, a personal computer, a personal digital assistant (PDA), an Internet appliance, or any other type of computing device.

The system 1500 of the instant example includes a processor 1512 such as a general purpose programmable processor. The processor 1512 includes a local memory 1514, and executes coded instructions 1516 present in the local memory 1514 and/or in another memory device. The processor 1512 may execute, among other things, the machine readable instructions represented in FIGS. 6 and 8-9. The processor 1512 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 1512 is in communication with a main memory including a volatile memory 1518 and a non-volatile memory 1520 via a bus 1522. The volatile memory 1518 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1520 may be implemented by flash memory and/or any other desired type of memory device. Access to the main memory 1518, 1520 is typically controlled by a memory controller (not shown).

The processing system 1500 also includes an interface circuit 1524. The interface circuit 1524 may be implemented by any type of interface standard, such as an Ethernet interface, a universal serial bus (USB), and/or a third generation input/output (3GIO) interface.

One or more input devices 1526 are connected to the interface circuit 1524. The input device(s) 1526 permit a user to enter data and commands into the processor 1512. The input device(s) can be implemented by, for example, a keyboard, a mouse, a touchscreen, a track-pad, a trackball, an isopoint and/or a voice recognition system.

One or more output devices 1528 are also connected to the interface circuit 1524. The output devices 1528 can be implemented, for example, by display devices (e.g., a liquid crystal display, a cathode ray tube display (CRT)), by a printer and/or by speakers. The interface circuit 1524, thus, typically includes a graphics driver card.

The interface circuit 1524 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1500 also includes one or more mass storage devices 1530 for storing machine readable instructions and data. Examples of such mass storage devices 1530 include floppy disk drives, hard drive disks, compact disk drives and digital versatile disk (DVD) drives. In some examples, the mass storage device 1530 may implement the network stack storage 415 and/or the routing state storage 425. Additionally or alternatively, in some examples the volatile memory 1518 may implement the network stack storage 415 and/or the routing state storage 425.

The coded instructions 1532 of FIGS. 6 and 8-9 may be stored in the mass storage device 1530, in the volatile memory 1518, in the non-volatile memory 1520, in the local memory 1514 and/or on a removable storage medium, such as a CD or DVD 1532.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to migrate a border gateway protocol session from a first router to a second router, the method comprising:
    exporting, using a processor, a connection state to migrate a transport control protocol connection supporting the border gateway protocol session between the first router and a session endpoint from the first router to the second router;
    after the transport control protocol connection has been migrated from the first router to the second router, emulating the session endpoint at the first router by announcing, from the first router to the second router, first routes learned by the first router from the session endpoint and obtained from a first routing information base storing routes learned by the first router, the first routing information base being different from a second routing information base storing routes for announcement by the first router, the second router to process the first routes to migrate the border gateway protocol session between the first router and the session endpoint from the first router to the second router;

marking the first routes as exported to cause the first routes to be retained after announcing the first routes; and deleting the first routes after expiration of a first period of time during which a subsequent announcement containing the first routes has not been received by the first router.

2. The method as defined in claim 1, further comprising providing configuration information for the border gateway protocol session from the first router to the second router before announcing the first routes from the first router to the second router, the configuration information specifying policies for route filtering and modification associated with the border gateway protocol session.

3. The method as defined in claim 1, wherein exporting the connection state comprises:

obtaining an Internet protocol address, a sequence number and an acknowledgment number for the transport control protocol connection supporting the border gateway protocol session with the session endpoint; and providing the Internet protocol address, the sequence number and the acknowledgment number to the second router.

4. The method as defined in claim 1, further comprising migrating an Internet protocol link supporting the transport control protocol connection from the first router to the second router after exporting the connection state but before announcing the first routes from the first router to the second router.

5. The method as defined in claim 1, further comprising:

storing, at the first router, a copy of the second routing information base; and providing the copy of the second routing information base to the second router.

6. The method as defined in claim 1, further comprising dropping transport control protocol packets received at a border gateway protocol port of the first router while the transport control protocol connection is being migrated from the first router to the second router.

7. A tangible machine readable medium comprising machine readable instructions which, when executed, cause a machine to perform operations comprising:

exporting a connection state to migrate a transport control protocol connection supporting a border gateway protocol session between the first router and a session endpoint from a first router to a second router;

after the transport control protocol connection has been migrated from the first router to the second router, emulating the session endpoint at the first router by announcing, from the first router to the second router, first routes learned by the first router from the session endpoint and obtained from a first routing information base storing routes learned by the first router, the first routing information base being different from a second routing information base storing routes for announcement by the first router, the second router to process the first routes to migrate the border gateway protocol session between the first router and the session endpoint from the first router to the second router;

marking the first routes as exported to cause the first routes to be retained after announcing the first routes; and deleting the first routes after expiration of a first period of time during which a subsequent announcement containing the first routes has not been received by the first router.

8. The tangible machine readable medium as defined in claim 7, wherein the operations further comprise providing configuration information for the border gateway protocol session from the first router to the second router before announcing the first routes from the first router to the second router, the configuration information specifying policies for route filtering and modification associated with the border gateway protocol session.

9. The tangible machine readable medium as defined in claim 7, wherein, to export the connection state, the operations further comprise:

obtaining an Internet protocol address, a sequence number and an acknowledgment number for the transport control protocol connection supporting the border gateway protocol session with the session endpoint; and providing the Internet protocol address, the sequence number and the acknowledgment number to the second router.

10. The tangible machine readable medium as defined in claim 7, wherein the operations further comprise migrating an Internet protocol link supporting the transport control protocol connection from the first router to the second router after the connection state is exported but before the first routes are announced from the first router to the second router.

11. The tangible machine readable medium as defined in claim 7, wherein the operations further comprise:

storing, at the first router, a copy of the second routing information base; and providing the copy of the second routing information base to the second router.

12. The tangible machine readable medium as defined in claim 7, wherein the operations further comprise dropping transport control protocol packets received at a border gateway protocol port of the first router while the transport control protocol connection is being migrated from the first router to the second router.

13. A first router comprising: a memory having machine readable instructions stored thereon; and a processor to execute the instructions to perform operations comprising:

exporting a connection state to migrate a transport control protocol connection supporting a border gateway protocol session between the first router and a session endpoint from the first router to a second router;

after the transport control protocol connection has been migrated from the first router to the second router, announcing, to the second router, first routes learned from the session endpoint and contained in an exported routing information base stored at the first router, the second router to process the first routes to migrate the border gateway protocol session between the first router and the session endpoint from the first router to the second router;

marking the first routes as exported to cause the first routes to be retained after the first routes have been announced; and deleting the first routes after expiration of a first period of time during which a subsequent announcement containing the first routes has not been received by the first router.

14. The first router as defined in claim 13, wherein the operations further comprise providing configuration information for the border gateway protocol session to the second router before announcing the first routes to the second router, the configuration information specifying policies for route filtering and modification associated with the border gateway protocol session.

15. The first router as defined in claim 13, wherein exporting the connection state comprises:
obtaining an Internet protocol address, a sequence number and acknowledgment number for the transport control protocol connection supporting the border gateway protocol session with the session endpoint; and
providing the Internet protocol address, the sequence number and the acknowledgment numbers to the second router.

16. The first router as defined in claim 13, wherein the operations further comprise migrating an Internet protocol link supporting the transport control protocol connection to the second router after the connection state is exported but before the first routes are announced to the second router.

17. The first router as defined in claim 13, wherein the exported routing information base is a first exported routing information base, and the operations further comprise:

storing, in the memory, a copy of a first routing information base as the first exported routing information base, the first routing information base containing the first routes, the first routes having been learned from the session endpoint;

storing, in the memory, a copy of a second routing information base as a second exported routing information base, the second routing information base containing second routes announced to the session endpoint; and providing the second exported routing information base to the second router.

18. The first router as defined in claim 13, further comprising a border gateway protocol port, wherein the operations further comprise causing transport control protocol packets received at the border gateway protocol port to be dropped while the transport control protocol connection is being migrated from the first router to the second router.

* * * * *